United States Patent
Kwon et al.

(10) Patent No.: US 9,727,785 B2
(45) Date of Patent: Aug. 8, 2017

(54) METHOD AND APPARATUS FOR TRACKING TARGETS

(71) Applicant: The Boeing Company, Chicago, IL (US)

(72) Inventors: Hyukseong Kwon, Oak Park, CA (US); Kyungnam Kim, Oak Park, CA (US); Yuri Owechko, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 142 days.

(21) Appl. No.: 14/743,349

(22) Filed: Jun. 18, 2015

(65) Prior Publication Data

US 2016/0371530 A1  Dec. 22, 2016

(51) Int. Cl.
| | |
|---|---|
| *G06K 9/00* | (2006.01) |
| *G06K 9/32* | (2006.01) |
| *G06K 9/62* | (2006.01) |
| *G06T 7/246* | (2017.01) |

(52) U.S. Cl.
CPC ......... *G06K 9/0063* (2013.01); *G06K 9/3241* (2013.01); *G06K 9/6212* (2013.01); *G06K 9/6215* (2013.01); *G06K 9/6292* (2013.01); *G06T 7/248* (2017.01); *G06K 2009/00644* (2013.01); *G06K 2009/6213* (2013.01); *G06T 2207/10048* (2013.01); *G06T 2207/20021* (2013.01)

(58) Field of Classification Search
USPC ................................................. 382/141–152
See application file for complete search history.

(56) References Cited

U.S. PATENT DOCUMENTS

| | | | |
|---|---|---|---|
| 6,704,466 B1* | 3/2004 | Yamamoto | G06F 17/30277 382/304 |
| 7,545,967 B1* | 6/2009 | Prince | G06T 5/50 128/920 |

(Continued)

FOREIGN PATENT DOCUMENTS

| | | |
|---|---|---|
| CN | 104715249 A | 6/2015 |
| EP | 2575079 A2 | 4/2013 |

(Continued)

OTHER PUBLICATIONS

Arth et al., "Object Reacquisition and Tracking in Large-Scale Smart Camera Networks," IEEE International Conference on Distributed Smart Cameras, Sep. 2007, pp. 156-163.

(Continued)

*Primary Examiner* — Alex Liew
(74) *Attorney, Agent, or Firm* — Yee & Associates, P.C.

(57) ABSTRACT

A method and apparatus for processing images. A set of candidate targets is identified in a first image and in a second image that corresponds with the first image. A set of first scores is generated for the set of candidate targets using the first image. A set of second scores is generated for the set of candidate targets using the second image. A set of final scores is computed for the set of candidate targets using the set of first scores and the set of second scores. A determination is made as to which of the set of candidate targets is a target of interest based on the set of final scores.

17 Claims, 14 Drawing Sheets

(56) References Cited

U.S. PATENT DOCUMENTS

| | | | |
|---|---|---|---|
| 8,131,786 B1* | 3/2012 | Bengio | G06F 17/30244 707/732 |
| 8,615,105 B1 | 12/2013 | Cheng et al. | |
| 9,036,910 B1 | 5/2015 | Mundhenk et al. | |
| 9,299,001 B2 | 3/2016 | Litvin et al. | |
| 2001/0028732 A1* | 10/2001 | Coulombe | G06T 7/0006 382/149 |
| 2006/0002615 A1* | 1/2006 | Fu | A61B 6/5235 382/254 |
| 2006/0204109 A1* | 9/2006 | Michelsson | G01N 21/95607 382/219 |
| 2008/0187234 A1* | 8/2008 | Watanabe | H04N 1/3876 382/254 |
| 2008/0199045 A1* | 8/2008 | Ekin | G06K 9/00791 382/104 |
| 2008/0205755 A1 | 8/2008 | Jackson et al. | |
| 2009/0297048 A1 | 12/2009 | Slotine et al. | |
| 2010/0092036 A1 | 4/2010 | Das et al. | |
| 2011/0274342 A1* | 11/2011 | Maeda | G01N 21/95623 382/149 |
| 2013/0016889 A1* | 1/2013 | Myronenko | G06T 7/003 382/131 |
| 2014/0072217 A1 | 3/2014 | Xu et al. | |
| 2015/0131851 A1 | 5/2015 | Bernal et al. | |
| 2015/0169956 A1 | 6/2015 | You et al. | |
| 2016/0371850 A1 | 12/2016 | Kwon et al. | |

FOREIGN PATENT DOCUMENTS

| | | |
|---|---|---|
| EP | 2575104 A1 | 4/2013 |
| WO | WO2008057451 A2 | 5/2008 |

OTHER PUBLICATIONS

Mundhenk et al., "Detection of unknown targets from aerial camera and extraction of simple object fingerprints for the purpose of target reacquisition," Intelligent Robots and Computer Vision XXIX: Algorithms and Techniques, SPIE vol. 8301, Jan. 2012, 14 pages.

Mei et al., "Robust Visual Tracking and Vehicle Classification via Sparse Representation," IEEE Transactions on Pattern Analysis and Machine Intelligence, vol. 33, Issue 11, Apr. 2011, pp. 2259-2272.

Khosla et al., "A Neuromorphic System for Object Detection and Classification," Signal Processing, Sensor Fusion, and Target Recognition XXII, SPIE vol. 8745, May 2013, 8 pages.

Kullback et al., "On Information and Sufficiency," The Annals of Mathematical Statistics, vol. 22, No. 1, Mar. 1951, pp. 79-86.

Hui, "VIVID Tracking Evaluation Web Site," The Robotics Institute, Carnegie Mellon University—School of Computer Science, copyright 2005, 2 pages, accessed Jun. 2, 2015. http://vision.cse.psu.edu/data/vividEval/datasets/datasets.html.

Poynton, "Digital Video and HDTV: Algorithms and Interfaces," Morgan Kaufmann Publishers, copyright 2003, Chapter 24: Luma and Color Differences, pp. 284-285.

Dalal et al., "Histograms of Oriented Gradients for Human Detection," IEEE Computer Society Conference on Computer Vision and Pattern Recognition, vol. 1, Jun. 2005, pp. 886-893.

Mundhenk et al., "Method and System for Using Fingerprints to Track Moving Objects in Video," U.S. Appl. No. 13/631,726, filed Sep. 28, 2012, 60 pages.

Guo et al., "Vehicle Fingerprinting for Reacquisition & Tracking in Videos," IEEE Computer Society Conference on Computer Vision and Pattern Recognition, vol. 2, Jun. 2005, pp. 761-768.

Ibrahim et al., "Visible and IR Data Fusion Technique Using the Contourlet Transform," International Conference on Computational Science and Engineering, Aug. 2009, vol. 2, pp. 42-47.

Waxman et al., "Fused EO/IR Detection & Tracking of Surface Targets: Flight Demonstrations," International Conference on Information Fusion, Jul. 2009, pp. 1439-1443.

Kim et al., "Bio-Inspired Algorithms for Target Detection and Classification in Airborne Videos," Association for Unmanned Vehicle Systems International, copyright 2012, 11 pages.

Cheng et al., "Vehicle Detection in Aerial Surveillance Using Dynamic Bayesian Networks," IEEE Transactions on Image Processing, vol. 21, No. 4, Apr. 2012, pp. 2152-2159.

Patel et al., "Automatic Target Recognition Based on Simultaneous Sparse Representation," IEEE International Conference on Image Processing, Sep. 2010, pp. 1377-1380.

Eikvil et al., "Classification-based vehicle detection in high-resolution satellite images," ISPRS Journal of Photogrammetry and Remote Sensing, vol. 64, Issue 1, Jan. 2009, pp. 65-72.

Nguyen et al., "On-line Boosting for Car Detection from Aerial Images," International IEEE Conference on Computer Sciences, Mar. 2007, pp. 87-95.

Welch, "The Generalization of 'Student's' Problem when Several Different Population Variances are Involved," Biometrika Trust, vol. 34, No. 1/2, Jan. 1947, pp. 28-35.

Leitloff et al., "Vehicle Detection in Very High Resolution Satellite Images of City Areas," IEEE Transactions on Geoscience and Remote Sensing, vol. 48, No. 7, Jul. 2010, pp. 2795-2806.

Kembhavi et al., "Vehicle Detection Using Partial Least Squares," IEEE Transactions on Pattern Analysis and Machine Intelligence, vol. 33, No. 6, Jun. 2011, pp. 1250-1265.

Xiao et al., "Vehicle Detection and Tracking in Wide Field-of-View Aerial Video," IEEE Conference on Computer Vision and Pattern Recognition, Jun. 2010, pp. 679-684.

Paravati et al., "A Genetic Algorithm for Target Tracking in FLIR Video Sequences Using Intensity Variation Function," IEEE Transactions on Instrumentation and Measurement, vol. 58, No. 10, Oct. 2009, pp. 3457-3467.

Kwon et al., "Method and Apparatus for Detecting Targets," U.S. Appl. No. 14/743,297, filed Jun. 18, 2015, 58 pages.

Extended European Search Report, dated Nov. 7, 2016, regarding Application No. EP16175212.6, 14 pages.

Extended European Search Report, dated Nov. 22, 2016, regarding Application No. EP16175214.2, 9 pages.

Goto et al., "CS-HOG: Color Similarity-based HOG," 19th Korea-Japan Joint Workshop on Frontiers of Computer Vision (FCV), Jan. 2013, pp. 266-271.

Yang et al., "Multi-Class Moving Target Detection with Gaussian Mixture Part Based Model," 2014 IEEE International Conference on Consumer Electronics (ICCE), Jan. 2014, pp. 386-387.

Office Action, dated Dec. 30, 2016, regarding U.S. Appl. No. 14/743,297, 21 pages.

Notice of Allowance, dated Mar. 14, 2017, regarding U.S. Appl. No. 14/743,297, 20 pages.

* cited by examiner

METHOD AND APPARATUS FOR TRACKING TARGETS

BACKGROUND INFORMATION

1. Field

The present disclosure relates generally to processing images and, in particular, to processing images to track targets of interest. Still more particularly, the present disclosure relates to a method and apparatus for tracking a target of interest using a sequence of electro-optical images and a sequence of infrared images that have been synchronized with respect to time.

2. Background

Sensor devices are oftentimes used to generate sensor data for the purpose of tracking targets of interest. Target tracking may be performed in a number of different ways. As one example, an unmanned aerial vehicle (UAV) may be used to surveil an area and track a target of interest that is on ground. The target of interest may be, for example, but is not limited to, a ground vehicle.

Electro-optical (EO) sensors, infrared sensors (IR), and sometimes a combination of both are used to perform target tracking. Electro-optical sensors are most often used for performing daytime surveillance. Infrared sensors are used for performing both daytime and nighttime surveillance. Processing only data received from electro-optical sensors or only data received from infrared sensors may limit target tracking capabilities. For example, this type of data processing may not provide a desired level of accuracy and efficacy with respect to target tracking.

Some currently available methods for target tracking include processing data from both electro-optical sensors and infrared sensors together. While these methods may be more effective than processing data received from one type of sensor, these methods may be unable to track targets that are at least partially occluded in images with the desired level of accuracy and efficacy. Therefore, it would be desirable to have a method and apparatus that take into account at least some of the issues discussed above, as well as other possible issues.

SUMMARY

In one illustrative embodiment, a method for processing images is provided. A set of candidate targets is identified in a first image and in a second image that corresponds with the first image. A set of first scores is generated for the set of candidate targets using the first image. A set of second scores is generated for the set of candidate targets using the second image. A set of final scores is computed for the set of candidate targets using the set of first scores and the set of second scores. A determination is made as to which of the set of candidate targets is a target of interest based on the set of final scores.

In another illustrative embodiment, a method for processing images is provided. A set of first candidate chips is identified in a first image. The set of first candidate chips capture a set of candidate targets. A set of first scores is generated for the set of first candidate chips using the first image. A set of second candidate chips is identified in a second image that corresponds with the set of first candidate chips. A set of second scores is generated for the set of second candidate chips using the second image. A set of final scores is computed for the set of candidate targets using the set of first scores and the set of second scores. A determination is made as to which of the set of candidate targets is a target of interest based on the set of final scores.

In yet another illustrative embodiment, an apparatus comprises an image processor, a scorer, and a target manager. The image processor identifies a set of candidate targets in a first image and in a second image that corresponds with the first image. The scorer generates a set of first scores for the set of candidate targets using the first image and a set of second scores for the set of candidate targets using the second image. The scorer computes a set of final scores for the set of candidate targets using the set of first scores and the set of second scores. The target manager determines which of the set of candidate targets is a target of interest based on the set of final scores.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to provide a method for tracking targets of interest that uses both electro-optical images and infrared images. In particular, the illustrative embodiments recognize and take into account that it may be desirable to provide a method for tracking targets of interest that uses a first type of image to match a candidate target to a target of interest based on chromaticity and a second type of image to determine, with a desired level of accuracy, whether the candidate target is indeed the target of interest based on shape information.

Thus, the illustrative embodiments provide a method for processing images to perform target tracking. As one illustrative example, a set of candidate targets is identified in a first image and in a second image that corresponds with the first image. A set of first scores is generated for the set of candidate targets using the first image. A set of second scores is generated for the set of candidate targets using the second image. A set of final scores is computed for the set of candidate targets using the set of first scores and the set of second scores. A determination is made as to which of the set of candidate targets is a target of interest based on the set of final scores.

In one illustrative example, the first image and the second image may take the form of, for example, without limitation, an electro-optical image and an infrared image. Chromaticity and shape information may be identified for each candidate target in these two images. Chromaticity information may be identified using the electro-optical image, while shape information may be identified using the infrared image. The chromaticity information is used to generate a first score for each candidate target, while the shape information is used to generate a second score for each candidate target. A final score based on both the first score and the second score is identified for each candidate target. The final score may be used to determine whether that candidate target is the target of interest.

Using both the electro-optical image and the infrared image in this manner may provide an effective and accurate method for tracking targets of interest. Further, this type of processing may be "occlusion-robust" in that targets may be tracked even when partially occluded in images.

Figure 1:
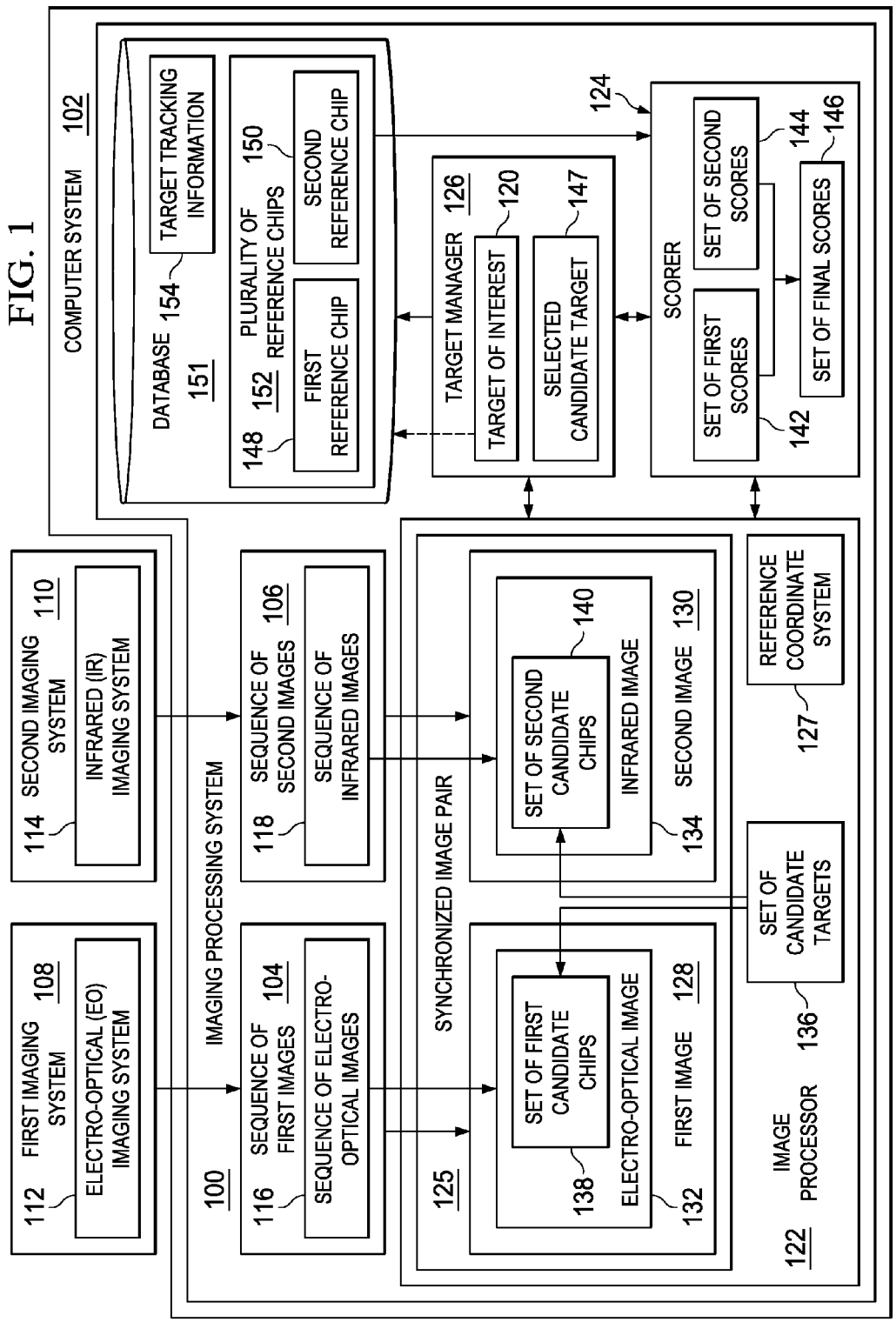
FIG. 1 is an illustration of an image processing system in the form of a block diagram in accordance with an illustrative embodiment.

Referring now to the figures and, in particular, with reference to FIG. 1, an illustration of an image processing system is depicted in the form of a block diagram in accordance with an illustrative embodiment. In this illustrative example, image processing system 100 may be implemented using software, hardware, firmware, or a combination thereof.

When software is used, the operations performed by image processing system 100 may be implemented using, for example, without limitation, program code configured to run on a processor unit. When firmware is used, the operations performed by image processing system 100 may be implemented using, for example, without limitation, program code and data and stored in persistent memory to run on a processor unit.

When hardware is employed, the hardware may include one or more circuits that operate to perform the operations performed by image processing system 100. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, image processing system 100 may be implemented in computer system 102. Image processing system 100 may be used to process sequence of first images 104 and sequence of second images 106. Each of these two sequences of images may be a plurality of images ordered with respect to time. Each image in each sequence of images may be a still image. In some cases, sequence of first images 104 may be referred to as a first video, while second sequence of second images 106 may be referred to as a second video. In these cases, each image in the first video and the second video may be referred to as a frame.

Image processing system 100 may receive sequence of first images 104 from first imaging system 108. Image processing system 100 may receive sequence of second images 106 from second imaging system 110. In one illustrative example, first imaging system 108 and second imaging system 110 may take the form of electro-optical (EO) imaging system 112 and infrared (IR) imaging system 114, respectively.

When first imaging system 108 takes the form of electro-optical imaging system 112, sequence of first images 104 may be referred to as sequence of electro-optical images 116. Similarly, when second imaging system 110 takes the form of infrared imaging system 114, sequence of second images 106 may be referred to as sequence of infrared images 118.

Image processing system 100 may process sequence of first images 104 and sequence of second images 106 to track target of interest 120. Target of interest 120 may be, for example, without limitation, a moving target of interest. In some cases, target of interest 120 may be identified prior to the beginning of processing sequence of first images 104 and sequence of second images 106. In other cases, target of interest 120 may be acquired during processing of sequence of first images 104 and sequence of second images 106.

Target of interest 120 may take a number of different forms. For example, without limitation, target of interest 120 may be a person, a type of ground vehicle, a type of aerial vehicle, a water vehicle, or some other type of object. The ground vehicle may be, for example, without limitation, a car, a truck, a tank, or some other type of ground vehicle. The aerial vehicle may be a missile, an aircraft, an unmanned aerial vehicle, or some other type of aerial vehicle.

As depicted, image processing system 100 may include image processor 122, scorer 124, and target manager 126. Each of image processor 122, scorer 124, and target manager 126 may be implemented using hardware, firmware, software, or a combination thereof.

In one illustrative example, image processor 122 may synchronize sequence of first images 104 and sequence of second images 106. Synchronizing these two sequences may include associating the images in these sequences based on time.

For example, without limitation, image processor 122 may identify synchronized image pair 125. Synchronized image pair 125 may include first image 128 from sequence of first images 104 and second image 130 from sequence of second images 106 that correspond to each other based on the points in time at which these two images were generated. In other words, first image 128 and second image 130 may correspond to a substantially same point in time. In some cases, first image 128 and second image 130 may take the form of electro-optical image 132 and infrared image 134, respectively.

In one illustrative example, synchronized image pair 125 may also be aligned with respect to reference coordinate system 127. In particular, first image 128 and second image 130 may be aligned such that the scene captured in first image 128 is substantially aligned with the scene captured in second image 130 with respect to reference coordinate system 127.

In some illustrative examples, image processor 122 may process both first image 128 and second image 130 to identify set of candidate targets 136. Each candidate target in set of candidate targets 136 may potentially be target of interest 120. For example, without limitation, first image 128 and second image 130 may be fused together to form a combined image from which set of candidate targets 136 may be identified.

In other illustrative examples, image processor 122 may process first image 128 and second image 130 separately to identify set of candidate targets 136. For example, without limitation, image processor 122 may identify set of first candidate chips 138 in first image 128 and set of second candidate chips 140 in second image 130.

As used herein, a chip may be a region of an image. In this manner, a candidate chip, such as one of set of first candidate chips 138 or one of set of second candidate chips 140, may be a region of an image that captures a candidate target. In other words, a candidate chip may be a region of an image that has been identified as potentially capturing target of interest 120.

Set of first candidate chips 138 may capture set of candidate targets 136 and set of second candidate chips 140 may capture set of candidate targets 136. In this manner, each of set of first candidate chips 138 may capture a same candidate target as a corresponding second candidate chip of set of second candidate chips 140.

In these illustrative examples, set of first candidate chips 138 and set of second candidate chips 140 may include the same number of candidate chips. In particular, because first image 128 and second image 130 are synchronized with respect to time and aligned with respect to reference coordinate system 127, each first candidate chip of set of first candidate chips 138 may share a one-to-one correspondence with a corresponding second candidate chip of set of second candidate chips 140.

Scorer 124 may process set of first candidate chips 138 and generate set of first scores 142 for set of first candidate chips 138. In particular, each of set of first scores 142 may be for a corresponding first candidate chip of set of first candidate chips 138. Similarly, scorer 124 may process set of second candidate chips 140 and generate set of second scores 144 for set of second candidate chips 140. In particular, each of set of second scores 144 may be for a corresponding second candidate chip of set of second candidate chips 140. Scorer 124 may then use set of first scores 142 and set of second scores 144 to generate set of final scores 146 for set of candidate targets 136.

The generation of set of first scores 142 may be performed using first reference chip 148 for target of interest 120. In one illustrative example, first reference chip 148 may take the form of a first image, such as an electro-optical image, or a portion of that first image that is known to capture target of interest 120. For example, without limitation, first reference chip 148 may be an electro-optical reference chip. In some cases, first reference chip 148 may be a first candidate chip from a previously processed first image in sequence of first images 104 that has been previously identified as capturing target of interest 120.

In a similar manner, the generation of set of second scores 144 may be performed using second reference chip 150 for target of interest 120. In one illustrative example, second reference chip 150 may take the form of a second image, such as an infrared image, or a portion of that second image that is known to capture target of interest 120. For example, without limitation, second reference chip 150 may be an infrared reference chip. In some cases, second reference chip 150 may be a second candidate chip from a previously processed second image in sequence of second images 106 that has been previously identified as capturing target of interest 120.

First reference chip 148 and second reference chip 150 may be stored in database 151. For example, first reference chip 148 and second reference chip 150 may belong to plurality of reference chips 152 stored in database 151.

In these illustrative examples, target manager 126 may use set of final scores 146 to determine which of set of candidate targets 136, if any, is target of interest 120. For example, target manager 126 may identify selected candidate target 147 from set of candidate targets 136 as being target of interest 120. In some illustrative examples, target manager 126 may store target tracking information 154 for selected candidate target 147 in database 151 for later use in tracking target of interest 120.

Target tracking information 154 may include, for example, without limitation, an identification of an index for first image 128 and an index for second image 130, a location of selected candidate target 147 in each of first image 128 and second image 130, and other types of information. In some cases, target manager 126 may store the first candidate chip from set of first candidate chips 138 that captures selected candidate target 147 as a new first reference chip in database 151 for use in tracking target of interest 120 in a next synchronized image pair. Further, target manager 126 may store the second candidate chip from set of second candidate chips 140 that captures selected candidate target 147 as a new second reference chip in database 151 for use in tracking target of interest 120 in the next synchronized image pair.

Figure 2:
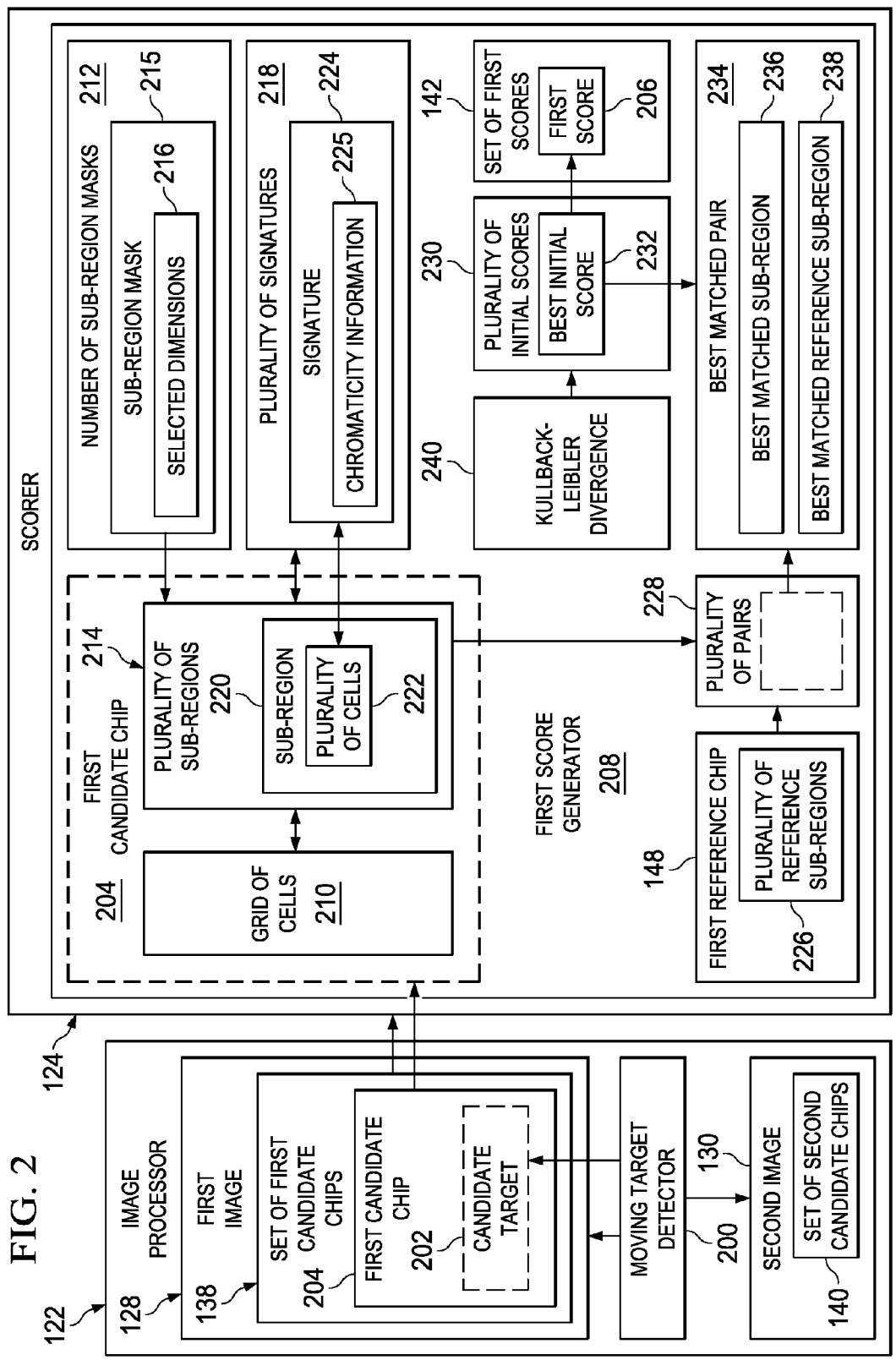
FIG. 2 is an illustration of an image processor and a scorer in greater detail in the form of a block diagram in accordance with an illustrative embodiment.

With reference now to FIG. 2, an illustration of image processor 122 and scorer 124 from FIG. 1 is depicted in greater detail in the form of a block diagram in accordance with an illustrative embodiment. As depicted in this example, image processor 122 may include moving target detector 200. Moving target detector 200 may be implemented using hardware, firmware, software, or a combination thereof.

Depending on the implementation, moving target detector 200 may process first image 128 or both first image 128 and second image 130 to identify candidate target 202. Candidate target 202 may be an example of one of set of candidate targets 136 in FIG. 1. In this illustrative example, moving target detector 200 is used to identify candidate target 202 in first image 128. In particular, moving target detector 200 may be used to identify or extract first candidate chip 204 in first image 128 capturing candidate target 202.

Candidate target 202 may be, for example, without limitation, a moving object. Moving target detector 200 may use any number of algorithms, techniques, or computational processors to detect candidate target 202.

Scorer 124 may then process first candidate chip 204 to generate first score 206 for first candidate chip 204, and thereby candidate target 202 captured in first candidate chip 204. First score 206 may be an example of one of set of first scores 142 in FIG. 1.

As depicted, scorer 124 may include first score generator 208 for generating set of first scores 142 in FIG. 1, including first score 206. First score generator 208 may be implemented using hardware, firmware, software, or a combination thereof.

In one illustrative example, first score generator 208 may begin by dividing first candidate chip 204 into grid of cells 210. Grid of cells 210 may be a grid of multiple rows and multiple columns. First score generator 208 may then use number of sub-region masks 212 to identify plurality of sub-regions 214. As used herein, a "number of" items may include one or more items. In this manner, number of sub-region masks 212 may include one or more masks.

Each of number of sub-region masks 212 may have different dimensions. As one illustrative example, number of sub-region masks 212 may include sub-region mask 215 having selected dimensions 216. Selected dimensions 216 may include, for example, without limitation, a row dimension and a column dimension. Selected dimensions 216 may be selected such that sub-region mask 215 is smaller than first candidate chip 204. For example, without limitation, if grid of cells 210 for first candidate chip 204 is a 5 by 5 grid, then sub-region mask 215 may have selected dimensions 216 of 3 by 3 or 4 by 4.

In one illustrative example, plurality of sub-regions 214 is identified by moving each of number of sub-region masks 212 to different locations over first candidate chip 204. In this manner, plurality of sub-regions 214 may include sub-regions that have different sizes and that overlap. Using sub-regions that have different sizes and that overlap may enable tracking target of interest 120 even when target of interest 120 is partially occluded within first image 128.

First score generator 208 generates plurality of signatures 218 for plurality of sub-regions 214. In particular, each signature of plurality of signatures 218 is generated for a corresponding sub-region of plurality of sub-regions 214.

Sub-region 220 may be an example of one of plurality of sub-regions 214. Sub-region 220 may include plurality of cells 222, which may include only a portion and not all of the cells in grid of cells 210. As one illustrative example, first score generator 208 may identify signature 224 for sub-region 220. Signature 224 may include chromaticity information 225. Chromaticity information 225 may be generated based on the pixel values of the pixels that fall within sub-region 220.

First score generator 208 may then identify plurality of reference sub-regions 226 in first reference chip 148. For example, without limitation, number of sub-region masks 212 may also be used to identify plurality of reference sub-regions 226. First score generator 208 may pair each of plurality of reference sub-regions 226 with each sub-region of plurality of sub-regions 214 to form plurality of pairs 228. In this manner, each of plurality of pairs 228 includes a unique combination of a sub-region from plurality of sub-regions 214 and a reference sub-region from plurality of reference sub-regions 226.

Plurality of initial scores 230 are then generated for plurality of pairs 228. In particular, first score generator 208 generates an initial score for each of plurality of pairs 228 to form plurality of initial scores 230. In this illustrative example, an initial score in plurality of initial scores 230 for a corresponding pair in plurality of pairs 228 indicates a measure of the likeness between the sub-region and the reference sub-region in that pair. In other words, the initial score may be a measure of the degree of matching between the sub-region and the reference sub-region in that pair, with respect to at least chromaticity. In one illustrative example, plurality of initial scores 230 may be generated based on Kullback-Leibler divergence 240.

The pair in plurality of pairs 228 having best initial score 232 of plurality of initial scores 230 is selected as best matched pair 234. Consequently, best matched pair 234 includes best matched sub-region 236 and best matched referenced sub-region 238. Best initial score 232 may then be assigned as first score 206 for first candidate chip 204, and thereby, first score 206 for candidate target 202.

Figure 3:
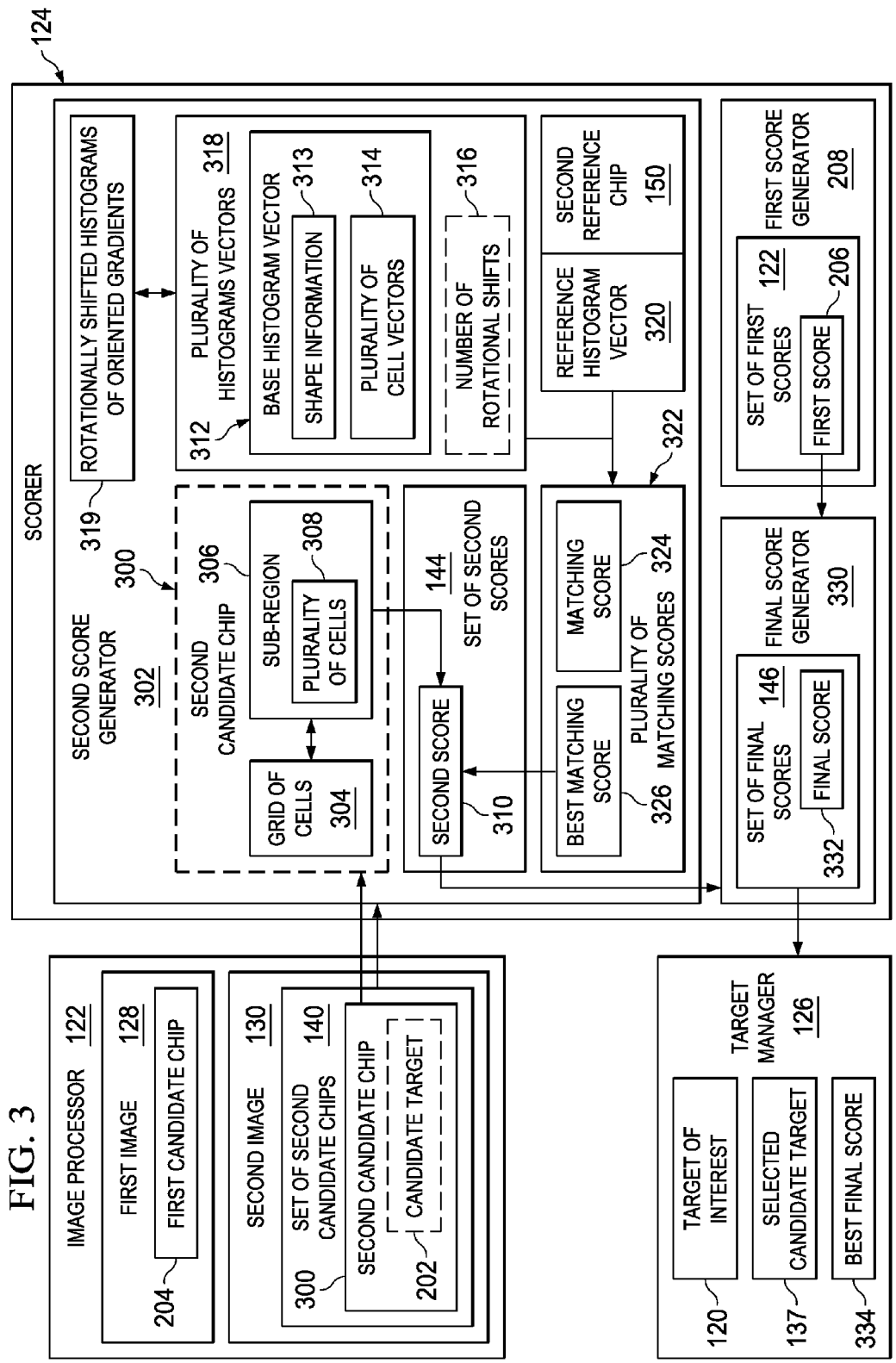
FIG. 3 is an illustration of an image processor, a scorer, and a target manager in greater detail in the form of a block diagram in accordance with an illustrative embodiment.

With reference now to FIG. 3, an illustration of image processor 122, scorer 124, and target manager 126 from FIGS. 1-2 is depicted in greater detail in the form of a block diagram in accordance with an illustrative embodiment. As depicted, image processor 122 may process second image 130 to generate set of second candidate chips 140.

In one illustrative example, image processor 122 may identify second candidate chip 300 in second image 130 that corresponds to first candidate chip 204 in first image 128 from FIG. 2. For example, without limitation, image processor 122 may identify second candidate chip 300 in second image 130 based on the alignment of second image 130 with first image 128 with respect to reference coordinate system 127 in FIG. 1. Second candidate chip 300 may have the same size as and be in the same location as first candidate chip 204 with respect to reference coordinate system 127 in FIG. 1.

Scorer 124 may include second score generator 302. Second score generator 302 may process second candidate chip 300. In particular, second score generator 302 may divide second candidate chip 300 into grid of cells 304. In one illustrative example, grid of cells 304 may have the same dimensions as grid of cells 210 for first candidate chip 204 in FIG. 2.

Second score generator 302 may identify sub-region 306 comprising plurality of cells 308 within second candidate chip 300. Sub-region 306 may be identified based on best matched sub-region 236 identified for first candidate chip 204 in FIG. 2.

In other illustrative examples, sub-region 306 may be the entire second candidate chip 300. In other words, second candidate chip 300 may be identified as having the same size and location in second image 130 as best matched sub-region 236 in FIG. 2 with respect to reference coordinate system 127. Second candidate chip 300 may then be divided into grid of cells 304, which may in its entirety form sub-region 306 comprised of plurality of cells 308.

Second score generator 302 may then generate second score 310 for sub-region 306, which may become second score 310 for second candidate chip 300 and, thereby, candidate target 202. In one illustrative example, second score generator 302 may identify base histogram vector 312 for sub-region 306. Base histogram vector 312 may be computed using the method of computing histograms of oriented gradients (HoG).

Base histogram vector 312 is a feature descriptor. This feature descriptor is generated by computing a histogram of oriented gradients for each cell in plurality of cells 308 of sub-region 306 and discretizing the histogram for each cell into bins to ultimately form a vector of cells in which each cell comprises a vector of bins. Base histogram vector 312 captures shape information 313 for candidate target 202 within sub-region 306 by capturing information about the gradients. Each bin within the vector of bins for a particular cell captures the proportional contribution of each pixel in that cell to the gradient magnitude at that pixel.

For example, without limitation, base histogram vector 312 may include plurality of cell vectors 314. As one illustrative example, base histogram vector 312 may include M cells, each of which corresponds to one of plurality of cells 308 of sub-region 306. Each of the M cells may have N rotational steps. In this manner, each of the M cells may be considered a cell vector.

Number of rotational shifts 316 may be applied to plurality of cells 308 in sub-region 306 to generate rotationally shifted versions of base histogram vector 312. Together, these rotationally shifted histogram vectors and base histogram vector 312 may form plurality of histogram vectors 318. As one illustrative example, when sub-region 306 comprises 9 cells that form a 3 by 3 grid, sub-region 306 may be rotated 8 times. As another illustrative example, when sub-region 306 comprises 16 cells that form a 4 by 4 grid, sub-region 306 may be rotated 12 times. In this manner, each of plurality of histogram vectors 318 may comprise rotationally shifted histograms of oriented gradients 319, which may take the form of circularly shifted histograms of oriented gradients in some cases.

Second score generator 302 may then compare each of plurality of histogram vectors 318 to reference histogram vector 320 for second reference chip 150 to generate plurality of matching scores 322. For example, matching score 324 in plurality of matching scores 322 may be a measure of the likeness or a degree of matching between reference histogram vector 320 and a corresponding histogram vector of plurality of histogram vectors 318.

In this illustrative example, second score generator 302 may select best matching score 326 from plurality of matching scores 322. Best matching score 326 may be assigned as second score 310 for sub-region 306, and thereby second score 310 for second candidate chip 300 and candidate target 202.

Scorer 124 may include final score generator 330. Final score generator 330 generates set of final scores 146 based on set of first scores 142 generated by first score generator 208 and set of second scores 144 generated by second score generator 302. For example, first score 206 and second score 310 for candidate target 202 may be used to generate final score 332 for candidate target 202. In one illustrative example, first score 206 may be multiplied by second score 310 to generate final score 332.

Target manager 126 may process set of final scores 146 and identify best final score 334 from set of final scores 146. If best final score 334 is within selected tolerances, the candidate target of set of candidate targets 136 from FIG. 1 having best final score 334 may then be identified as being target of interest 120. This candidate target may be selected candidate target 137. Selected tolerances for best final score 334 may include a minimum threshold, a maximum threshold, or both, depending on the implementation.

Figure 4:
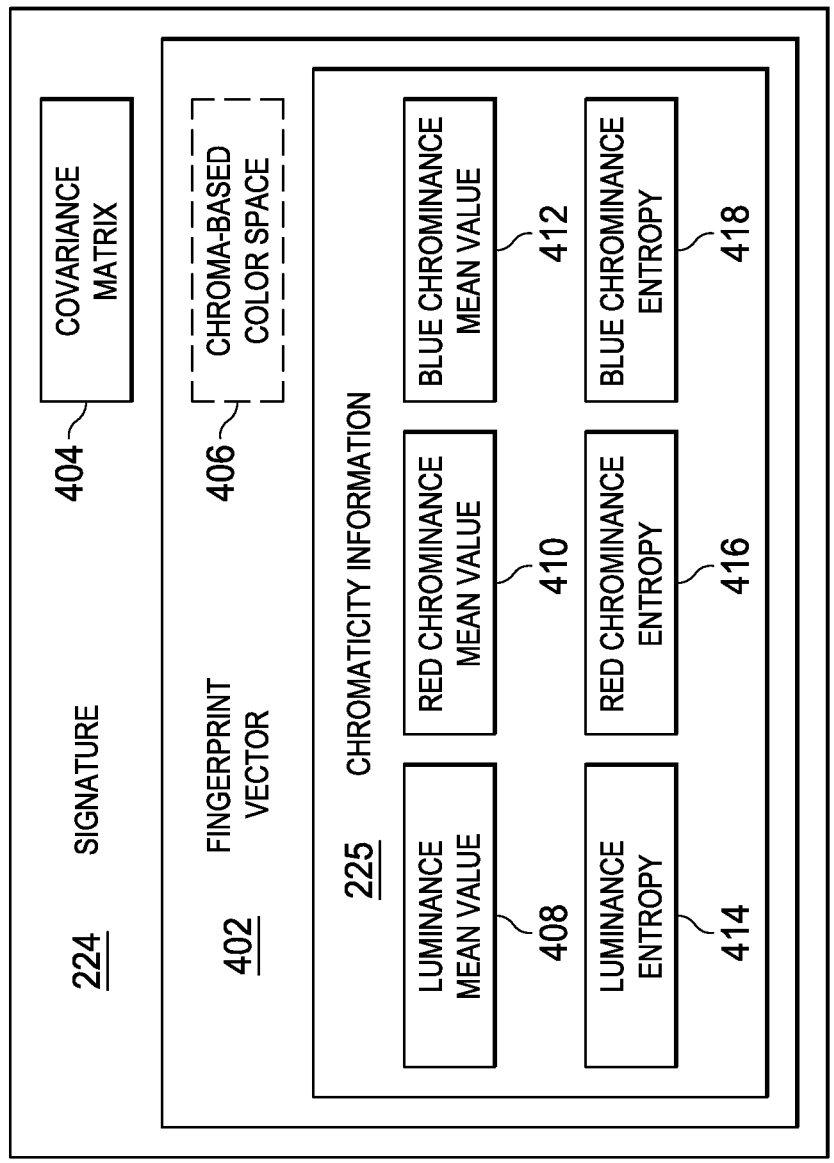
FIG. 4 is an illustration of a signature in greater detail in the form of a block diagram in accordance with an illustrative embodiment.

With reference now to FIG. 4, an illustration of signature 224 from FIG. 2 is depicted in greater detail in the form of a block diagram in accordance with an illustrative embodiment. In this illustrative example, signature 224 for sub-region 220 in FIG. 2 may include fingerprint vector 402 and covariance matrix 404 for sub-region 220 in FIG. 2.

Fingerprint vector 402 may be generated with respect to a color space, such as, but not limited to, chroma-based color space 406. In this manner, fingerprint vector 402 may provide chromaticity information 225. Chromaticity information 225 may include, for example, without limitation, luminance mean value 408, red chrominance mean value 410, blue chrominance mean value 412, luminance entropy 414, red chrominance entropy 416, and blue chrominance entropy 418.

In this manner, image processing system 100 provides occlusion-robust image processing for the purposes of target detection and tracking. Using image processing system 100, the accuracy and efficiency with which target detection and tracking are performed may be improved. Further, this type of target detection and tracking may enable improved actions, such as, but not limited to, surveillance actions, reconnaissance actions, weapons guidance, and other types of actions.

The illustrations of image processing system 100 in FIG. 1, image processor 122 in FIGS. 1-3, scorer 124 in FIGS. 1-3, target manager 126 in FIGS. 1 and 3, and signature 224 in FIGS. 1 and 4 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 5:
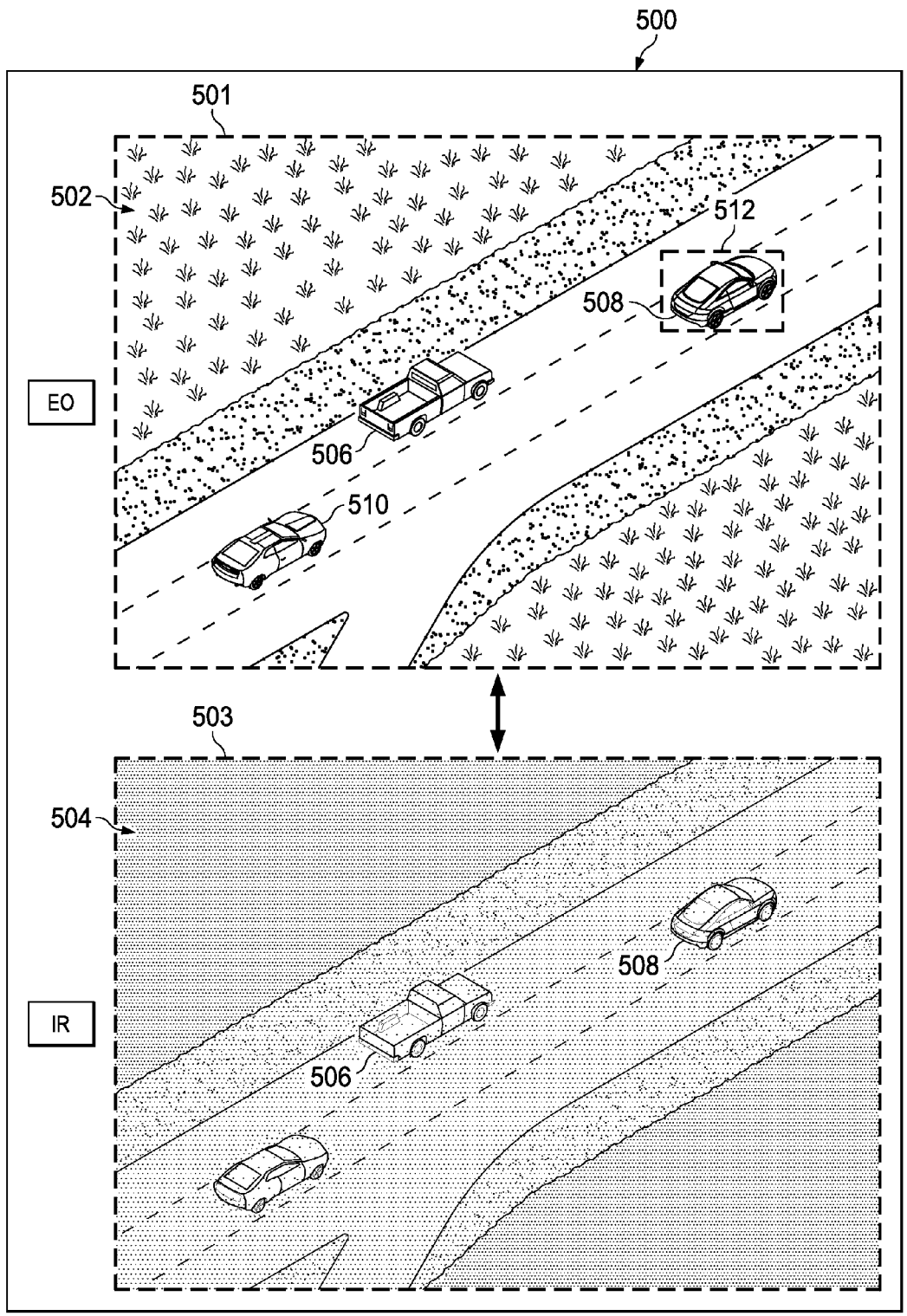
FIG. 5 is an illustration of a synchronized image pair in accordance with an illustrative embodiment.

With reference now to FIG. 5, an illustration of a synchronized image pair is depicted in accordance with an illustrative embodiment. In this illustrative example, synchronized image pair 500 may be an example of one implementation for synchronized image pair 125 in FIG. 1. As depicted, synchronized image pair 500 includes electro-optical image 501 and infrared image 503, which may be examples of implementations for electro-optical image 132 and infrared image 134, respectively, in FIG. 1.

Electro-optical image 501 and infrared image 503 may capture background 502 and background 504, respectively. Further, electro-optical image 501 and infrared image 503 may both capture candidate target 506, candidate target 508, and candidate target 510.

In this illustrative example, first candidate chip 512 has been identified in electro-optical image 501. As depicted, first candidate chip 512 captures candidate target 508.

Figure 6:
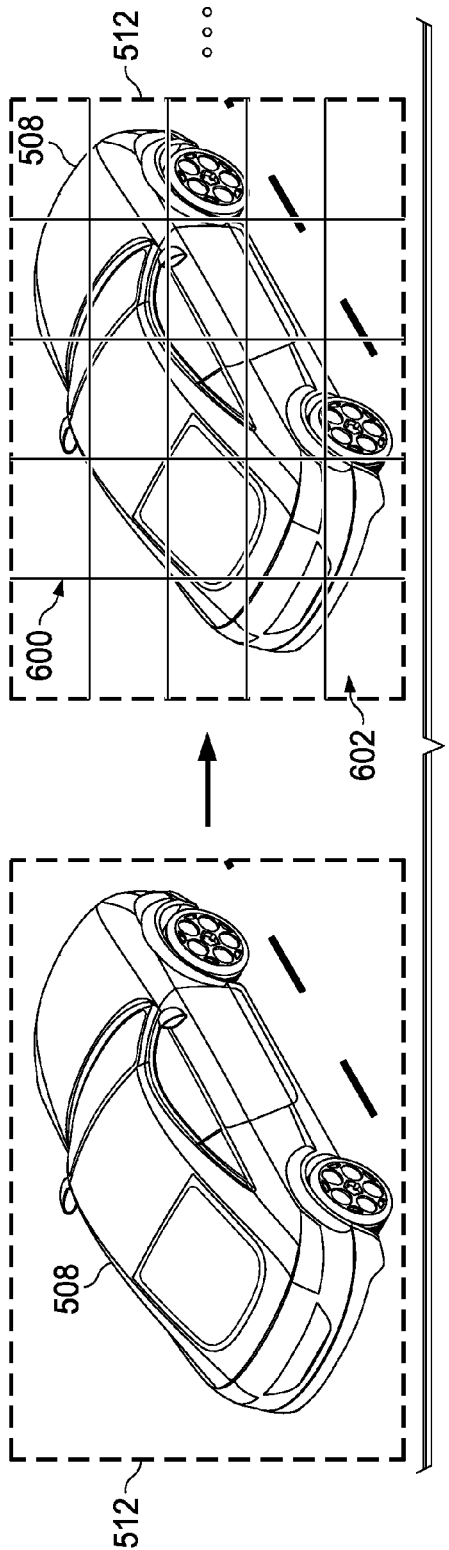
FIG. 6 is an illustration of one manner of dividing a first candidate chip into a grid of cells in accordance with an illustrative embodiment.

With reference now to FIG. 6, an illustration of one manner of dividing first candidate chip 512 from FIG. 5 into a grid of cells is depicted in accordance with an illustrative embodiment. As depicted, first candidate chip 512 may be divided into grid 600 comprising cells 602. Grid 600 may be a 5 by 5 grid in this illustrative example. Further, cells 602 include 25 cells in this example.

Figure 7:
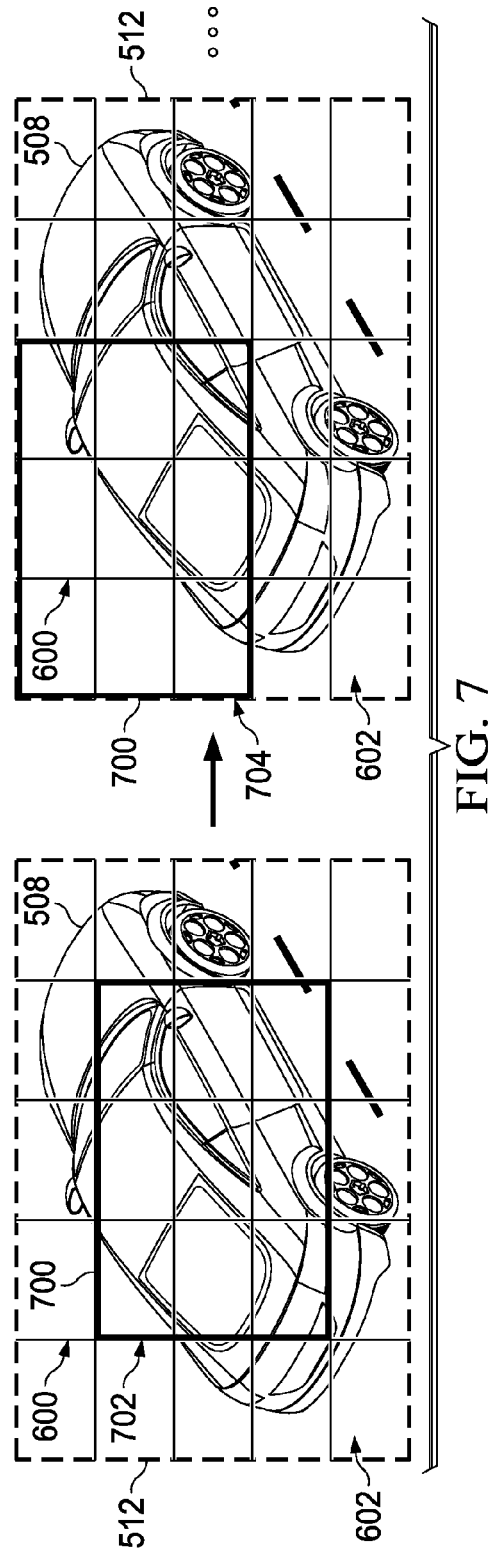
FIG. 7 is an illustration of different sub-regions in a first candidate chip in accordance with an illustrative embodiment.

With reference now to FIG. 7, an illustration of different sub-regions in first candidate chip 512 from FIGS. 5-6 is depicted in accordance with an illustrative embodiment. As depicted, sub-region mask 700 has been positioned over a portion of first candidate chip 512 to identify sub-region 702.

Sub-region mask 700 may be an example of one implementation for sub-region mask 215 in FIG. 2. As depicted, sub-region mask 700 may be a 3 by 3 grid, comprising 9 cells. Sub-region mask 700 may be moved to a different location over first candidate chip 512 to identify another sub-region, such as sub-region 704.

Sub-region mask 700 may be moved to other locations to identify other sub-regions within first candidate chip 512. Based on the size of sub-region mask 700, a portion of each of the sub-regions identified for first candidate chip 512 may overlap with some portion of at least one other sub-region.

Figure 8:
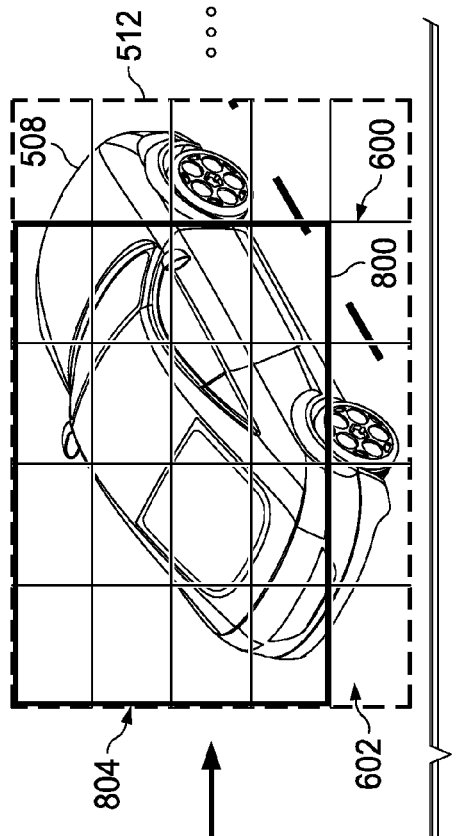
FIG. 8 is an illustration of different sub-regions in a first candidate chip in accordance with an illustrative embodiment.
Figure 8:
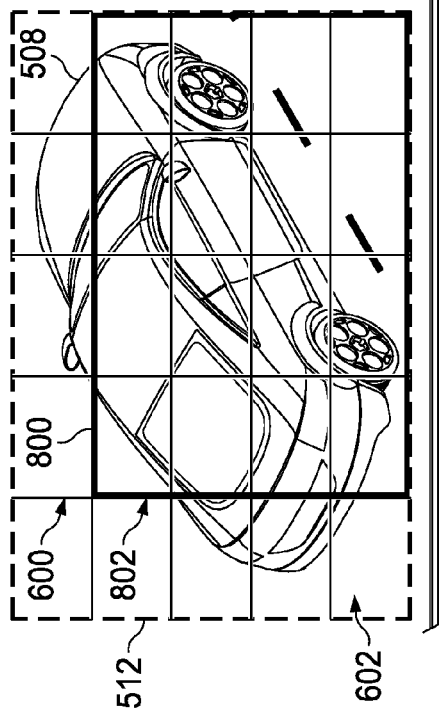

With reference now to FIG. 8, an illustration of different sub-regions in first candidate chip 512 from FIGS. 5-6 is depicted in accordance with an illustrative embodiment. As depicted, sub-region mask 800 has been positioned over a portion of first candidate chip 512 to identify sub-region 802.

Sub-region mask 800 may be an example of one implementation for sub-region mask 215 in FIG. 2. As depicted, sub-region mask 800 may be a 4 by 4 grid, comprising 16 cells. Sub-region mask 800 may be moved to a different location over first candidate chip 512 to identify another sub-region, such as sub-region 804.

Sub-region mask 800 may be moved to other locations to identify other sub-regions within first candidate chip 512. Based on the size of sub-region mask 800, a portion of each of the sub-regions identified for first candidate chip 512 may overlap with some portion of at least one other sub-region.

Figure 9:
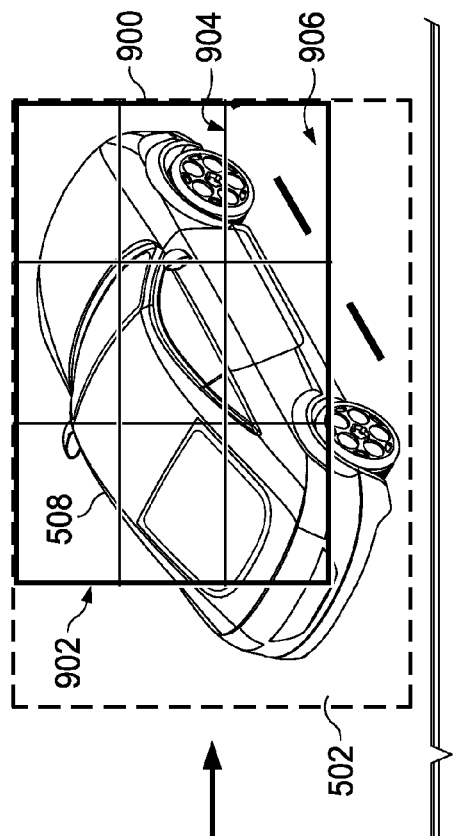
FIG. 9 is an illustration of a sub-region identified in a portion of an infrared image in accordance with an illustrative embodiment.
Figure 9:
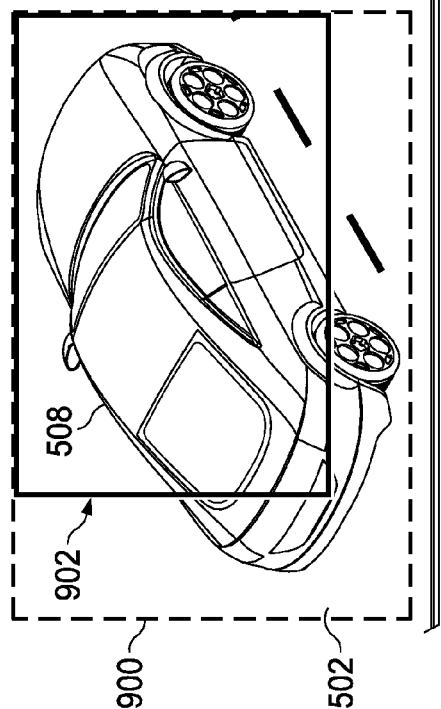

With reference now to FIG. 9, an illustration of a sub-region identified in a portion of infrared image 503 from FIG. 5 is depicted in accordance with an illustrative embodiment. In this illustrative example, second candidate chip 900 may be identified as the portion of infrared image 503 capturing candidate target 508.

Sub-region 902 within second candidate chip 900 may be identified as corresponding to a best matched sub-region from the sub-regions identified for first candidate chip 512 in FIG. 7. Sub-region 902 may be an example of one implementation for sub-region 306 in FIG. 3. In this illustrative example, sub-region 902 may be divided into grid 904 comprising cells 906. Grid 904 may be a 3 by 3 grid and cells 906 may comprise 9 cells in this illustrative example.

Figure 10:
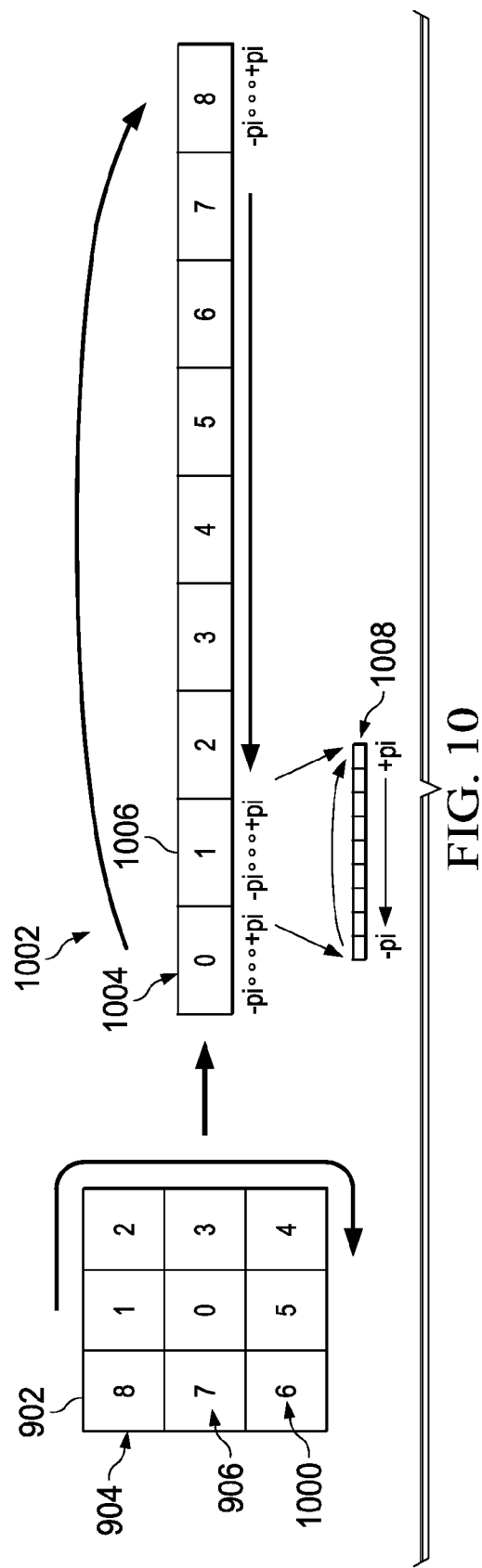
FIG. 10 is an illustration of a sub-region in accordance with an illustrative embodiment.

With reference now to FIG. 10, an illustration of sub-region 902 from FIG. 9 is depicted in accordance with an illustrative embodiment. In this illustrative example, cells 906 have been assigned corresponding index numbers 1000.

Base histogram vector 1002 may be generated for sub-region 902. Base histogram vector 1002 may be an example of one implementation for base histogram vector 312 in FIG. 3. As depicted, base histogram vector 1002 may comprise plurality of cell vectors 1004.

Cell vector 1006 may be an example of one of plurality of cell vectors 1004. Cell vector 1006 may include plurality of bins 1008. Plurality of bins 1008 may represent a histogram of oriented gradients that has been discretized.

The illustrations in FIGS. 5-10 are not meant to imply physical or architectural limitations to the manner in which an illustrative embodiment may be implemented. In particular, the different items shown in FIGS. 5-10 may be illustrative examples of how items shown in block form in FIG. 1-4 can be implemented.

Figure 11:
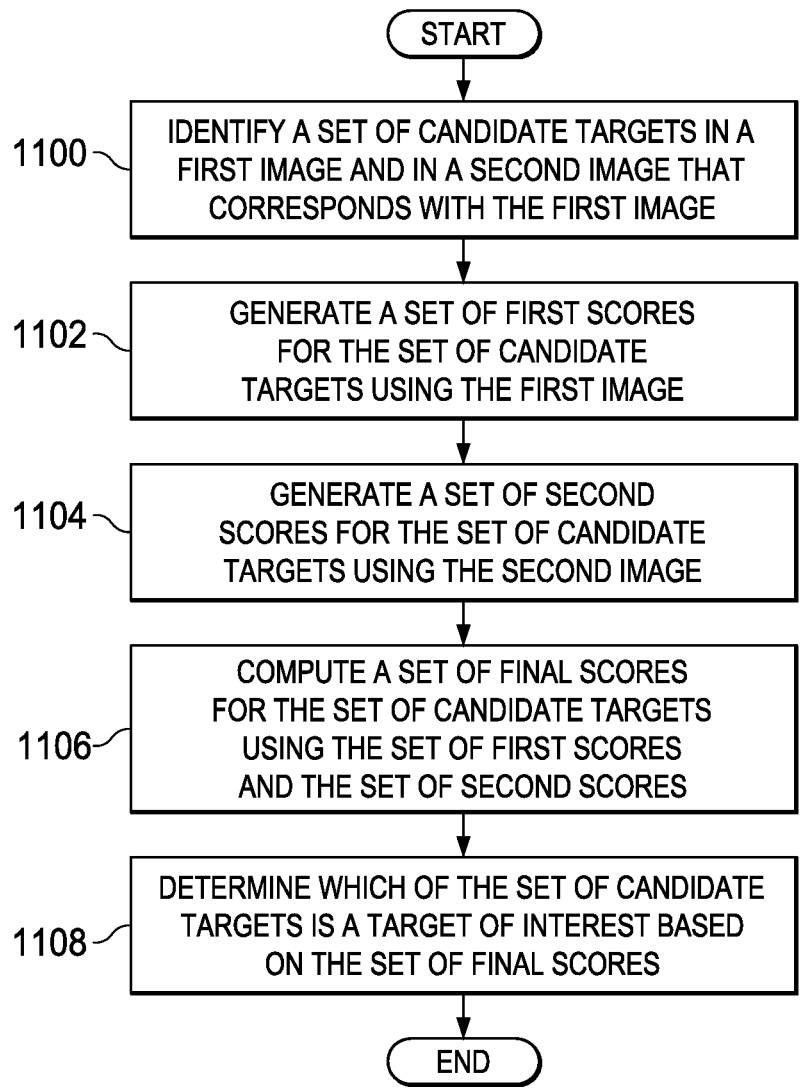
FIG. 11 is an illustration of a process for tracking a target of interest in the form of a flowchart in accordance with an illustrative embodiment.

With reference now to FIG. 11, an illustration of a process for tracking a target of interest is depicted in the form of a flowchart in accordance with an illustrative embodiment. The process illustrated in FIG. 11 may be implemented using image processing system 100 from FIG. 1.

The process may begin by identifying a set of candidate targets in a first image and in a second image that corresponds with the first image (operation 1100). Next, a set of first scores may be generated for the set of candidate targets using the first image (operation 1102). A set of second scores may then be generated for the set of candidate targets using the second image (operation 1104).

Thereafter, a set of final scores may be generated for the set of candidate targets using the set of first scores and the set of second scores (operation 1106). A determination is then made as to which of the set of candidate targets is a target of interest based on the set of final scores (operation 1108), with the process terminating thereafter.

Figure 12:
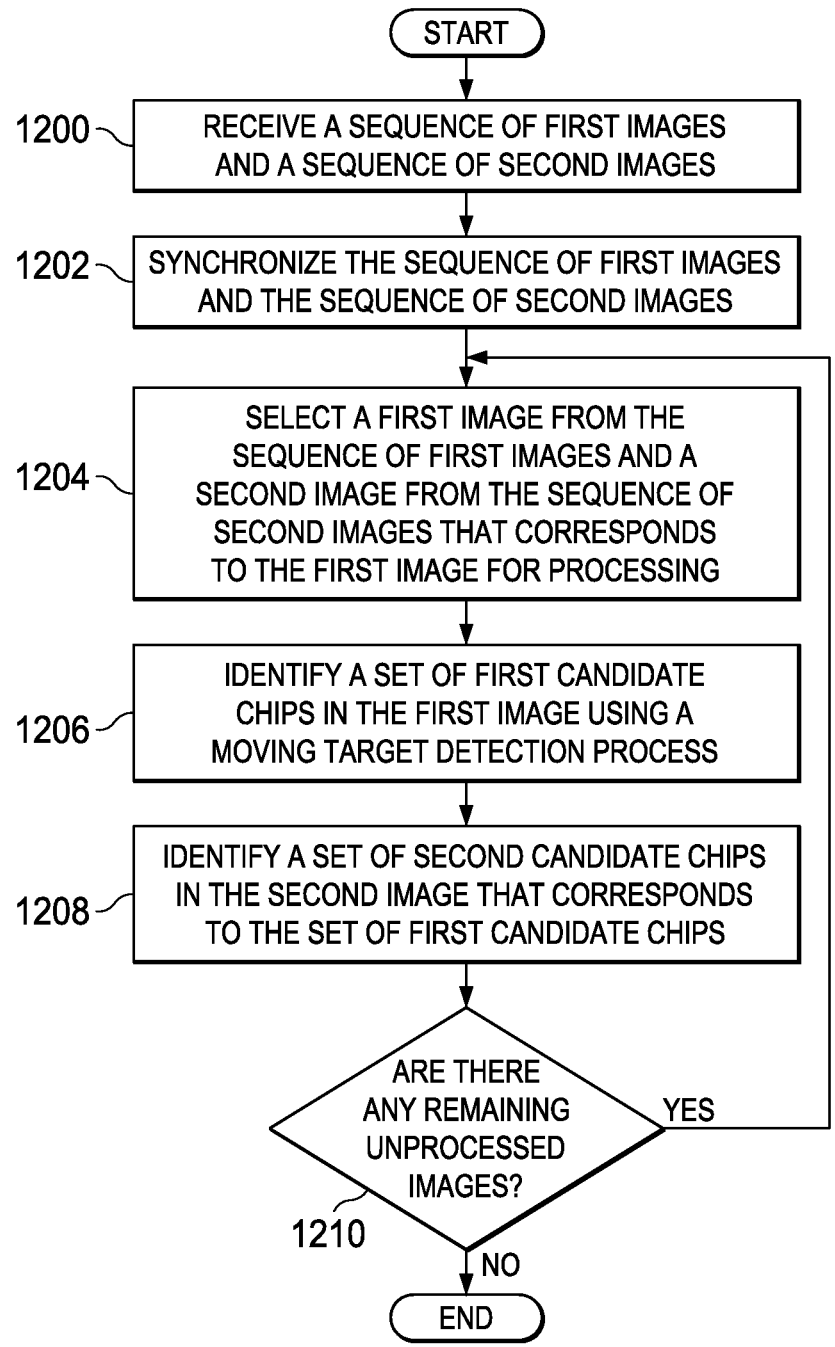
FIG. 12 is an illustration of a process for identifying candidate chips in images in the form of a flowchart in accordance with an illustrative embodiment.

With reference now to FIG. 12, an illustration of a process for identifying candidate chips in images is depicted in the form of a flowchart in accordance with an illustrative embodiment. The process illustrated in FIG. 12 may be implemented using image processor 122 as described in FIGS. 1-3.

The process may begin by receiving a sequence of first images and a sequence of second images (operation 1200). The sequence of first images and the sequence of second images are synchronized (operation 1202). Operation 1202 may be performed such that the sequence of first images and the sequence of second images are synchronized with respect to time. In some cases, this synchronization may also include aligning the sequence of first images and the sequence of second images with respect to a reference coordinate system.

Next, a first image is selected from the sequence of first images and a second image is selected from the sequence of second images that corresponds to the first image for processing (operation 1204). A set of first candidate chips is identified in the first image using a moving target detection process (operation 1206). A set of second candidate chips that corresponds to the set of first candidate chips is identified in the second image (operation 1208).

A determination may then be made as to whether there are any remaining unprocessed images (operation 1210). If any remaining unprocessed images are present, the process returns to operation 1204 as described above. Otherwise, the process terminates.

Figure 13:
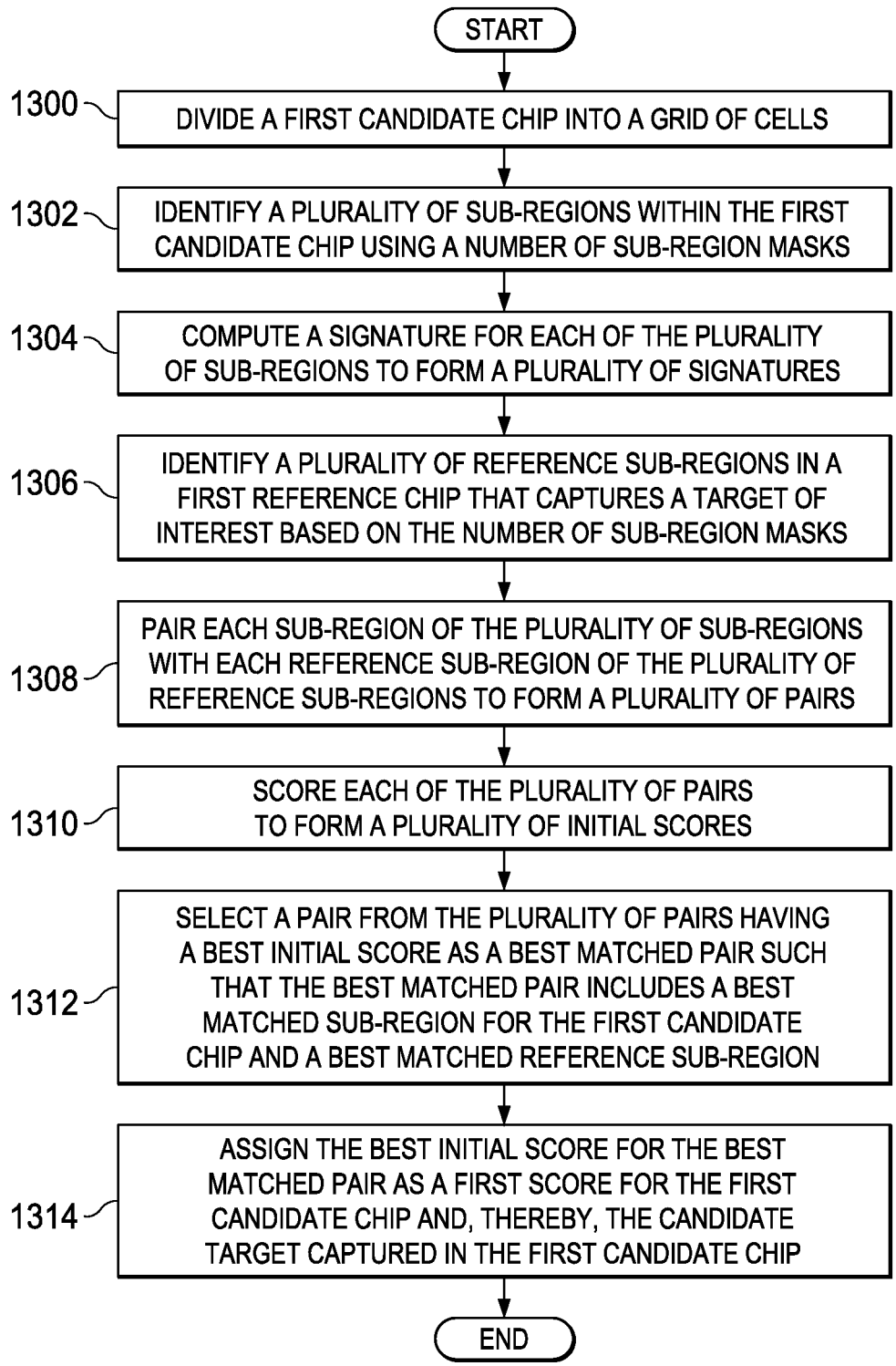
FIG. 13 is an illustration of a process for generating a first score for a first candidate chip in the form of a flowchart in accordance with an illustrative embodiment.

With reference now to FIG. 13, an illustration of a process for generating a first score for a first candidate chip is depicted in the form of a flowchart in accordance with an illustrative embodiment. The process illustrated in FIG. 13 may be implemented using scorer 124 described in FIGS. 1-3. Further, this process may be an example one manner in which operation 1102 in FIG. 11 may be implemented.

The process may begin by dividing a first candidate chip into a grid of cells (operation 1300). In operation 1300, the first candidate chip may be, for example, one of the set of first candidate chips identified in operation 1206 in FIG. 12.

A plurality of sub-regions is identified within the first candidate chip using a number of sub-region masks (operation 1302). Each of the number of sub-region masks in operation 1302 may have different dimensions. A signature is computed for each of the plurality of sub-regions to form a plurality of signatures (operation 1304).

In one illustrative example, in operation 1304, a signature for a particular sub-region may be computed such that the signature vector includes a fingerprint vector and covariance matrix:

$$S = \{f, C\}, \quad (1)$$

where $$f = \{L_{mean}, Cr_{Mean}, Cb_{mean}, L_{ent}, Cr_{ent}, Cb_{ent}\} \quad (2)$$

where S is the signature for the sub-region, f is the fingerprint vector, C is the covariance matrix for the sub-region, $L_{mean}$ is the luminance mean value for the sub-region, $Cr_{mean}$ is the red chrominance mean value for the sub-region, $Cb_{mean}$ is the blue chrominance mean value for the sub-region, $L_{ent}$ is the luminance entropy for the sub-region, $Cr_{ent}$ is the red chrominance entropy for the sub-region, and $Cb_{ent}$ is the blue chrominance entropy for the sub-region.

Thereafter, a plurality of reference sub-regions may be identified in a first reference chip that captures a target of interest based on the number of sub-region masks (operation 1306). Each sub-region of the plurality of sub-regions may be paired with each reference sub-region of the plurality of reference sub-regions to form a plurality of pairs (operation 1308). Each of the plurality of pairs may be scored to form a plurality of initial scores (operation 1310).

In operation 1310, in one illustrative example, each of the plurality of initial scores may be generated based on Kullback-Leibler Divergence (KLD). For example, $$KLD_{T,K}^{i,j} = 0.5 \times (KLD_{T|K}^{i|j} + KLD_{K|T}^{j|i}) \quad (3)$$

where $$KLD_{T|K}^{i|j} = \log\left(\frac{\det(C_T^i)}{\det(C_K^j)}\right) + \text{trace}\left((C_T^i)^{-1} C_K^j\right) + (f_T^i - f_K^j)(C_T^i)^{-1}(f_T^i - f_K^j)^T, \quad (4)$$

$$KLD_{K|T}^{j|i} = \log\left(\frac{\det(C_K^j)}{\det(C_T^i)}\right) + \text{trace}\left((C_K^j)^{-1} C_T^i\right) + (f_K^j - f_T^i)(C_K^j)^{-1}(f_K^j - f_T^i)^K, \quad (5)$$

where T is the target of interest and corresponds to the first reference chip, K is the candidate target and corresponds to the first candidate chip, i is a sub-region in the first reference chip, j is a sub-region in the first candidate chip, $KLD_{T,K}^{i,j}$ is the initial score, $C_T^i$ is the covariance matrix for the $i^{th}$ sub-region in the first reference chip, $C_K^j$ is the covariance matrix for the $i^{th}$ sub-region in the first candidate chip, $f_T^i$ is the fingerprint vector for the $i^{th}$ sub-region in the first reference chip, and $f_K^j$ is fingerprint vector for the $i^{th}$ sub-region in the first candidate chip.

Then, a pair from the plurality of pairs having a best initial score is selected as a best matched pair such that the best matched pair includes a best matched sub-region for the first candidate chip and a best matched reference sub-region (operation 1312). In operation 1312, the best initial score may be identified as follows:

$$KLD_{T,K} = \min_i(\min_j(\{KLD_{T,K}^{i,j}\})) \quad (6)$$

where $KLD_{T,K}$ is the best initial score and, thereby, the first score for the first candidate chip.

The best initial score for the best matched pair is assigned as a first score for the first candidate chip and, thereby, the candidate target captured in the first candidate chip (operation 1314), with the process terminating thereafter. The process described in FIG. 13 may be repeated for each first candidate chip in the set of first candidate chips identified.

Figure 14:
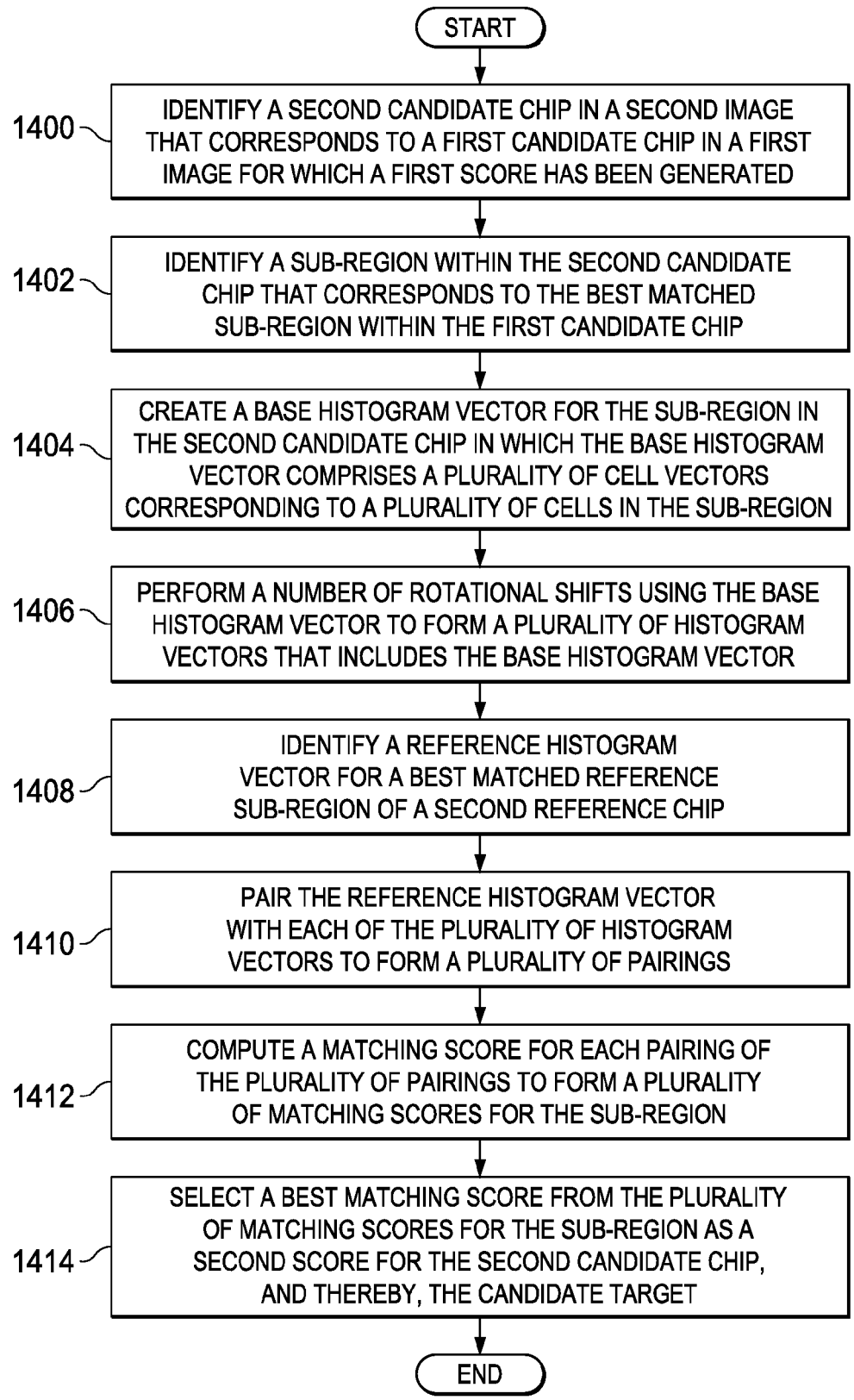
FIG. 14 is an illustration of a process for generating a second score for a second candidate chip in the form of a flowchart in accordance with an illustrative embodiment.

With reference now to FIG. 14, an illustration of a process for generating a second score for a second candidate chip is depicted in the form of a flowchart in accordance with an illustrative embodiment. The process illustrated in FIG. 14 may be implemented using scorer 124 and image processor 122 described in FIGS. 1-3. Further, this process may be an example of one manner in which operation 1104 in FIG. 11 may be implemented.

The process may begin by identifying a second candidate chip in a second image that corresponds to a first candidate chip in a first image for which a first score has been generated (operation 1400). Then, a sub-region within the second candidate chip that corresponds to the best matched sub-region within the first candidate chip is identified (operation 1402). In some cases, in operation 1402, the entire second candidate chip may form the sub-region.

Thereafter, a base histogram vector is created for the sub-region in the second candidate chip in which the base histogram vector comprises a plurality of cell vectors corresponding to a plurality of cells in the sub-region (operation 1404). A number of rotational shifts are performed using the base histogram vector to form a plurality of histogram vectors that includes the base histogram vector (operation 1406).

Next, a reference histogram vector is identified for a best matched reference sub-region of a second reference chip (operation 1408). The reference histogram vector may be paired with each of the plurality of histogram vectors to form a plurality of pairings (operation 1410). A matching score may be computed for each pairing of the plurality of pairings to form a plurality of matching scores for the sub-region (operation 1412). In operation 1412, in one illustrative example, a matching score may be computed as follows:

$$d_{CSHOG}(T, K) = \min_r \left( \sum_{i=1}^{n} \frac{|h_T^0(i) - h_K^r(i)|^2}{h_T^0(i) + h_K^r(i)} \right) \quad (7)$$

where T is the target of interest and corresponds to the second reference chip, K is the candidate target and corresponds to the second candidate chip, $d_{CSHOG}(T,K)$ is the matching score, $h_T^0(i)$ is the $i^{th}$ element of the reference histogram vector for the second reference chip with no rotation, and $h_K^r(i)$ is the $i^{th}$ element of the histogram vector for the sub-region with the $r^{th}$ rotation.

A best matching score may be selected from the plurality of matching scores for the sub-region as a second score for the second candidate chip, and thereby, the candidate target (operation 1414), with the process terminating thereafter. In one illustrative example, the best matching score may be the minimum value for each $r^{th}$ rotation. This process may be repeated for each of the set of second candidate chips identified.

Figure 15:
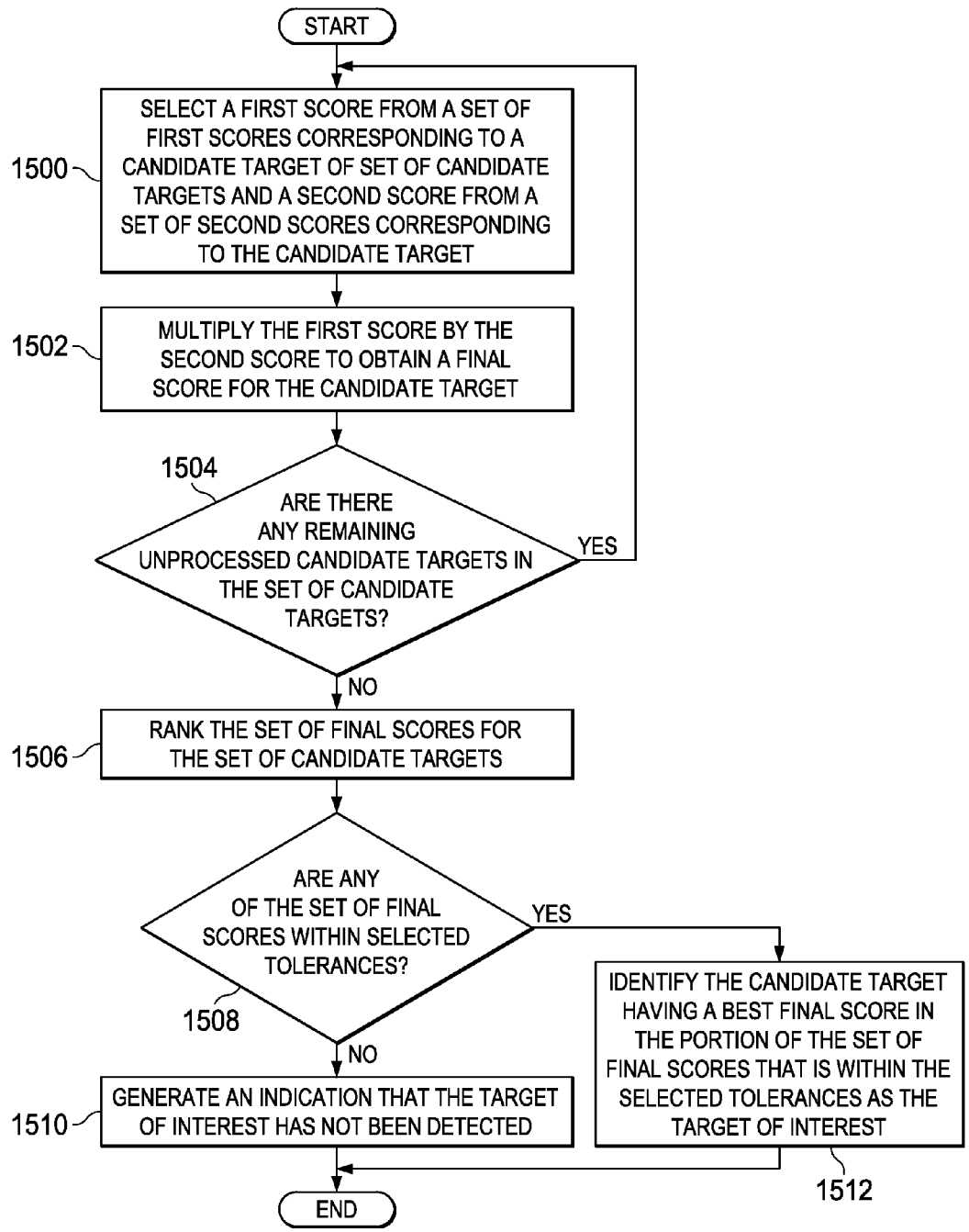
FIG. 15 is an illustration of a process for tracking a target of interest in the form of a flowchart in accordance with an illustrative embodiment.

With reference now to FIG. 15, an illustration of a process for tracking a target of interest is depicted in the form of a flowchart in accordance with an illustrative embodiment. The process may be implemented using scorer 124 and target manager 126 described in FIGS. 1-3.

The process may begin by selecting a first score from a set of first scores corresponding to a candidate target of a set of candidate targets and a second score from a set of second scores corresponding to the candidate target (operation 1500). The first score may be multiplied by the second score to obtain a final score for the candidate target (operation 1502).

In one illustrative example, in operation 1502, the final score may be computed as follows:

$$d_{Final}^{T,K} = KLD_{T,K} \cdot d_{CSHOG}(T,K) \quad (8)$$

where T is the target of interest, K is the candidate target, and $d_{Final}^{T,K}$ is the final score indicating the degree of matching between the target of interest and the candidate target.

A determination may then be made as to whether there are any remaining unprocessed candidate targets in the set of candidate targets (operation 1504). If any remaining unprocessed candidate targets are present, the process returns to operation 1500 as described above. Otherwise, the set of final scores for the set of candidate targets may be ranked (operation 1506). A determination may be made as to whether any of the set of final scores is within selected tolerances (operation 1508). In operation 1508, being within selected tolerances may include being above a minimum threshold, below a maximum threshold, or both.

If none of the set of final scores is within selected tolerances, an indication that the target of interest has not been detected is generated (operation 1510), with the process terminating thereafter. Otherwise, the candidate target having a best final score in the portion of the set of final scores that is within the selected tolerances is identified as the target of interest (operation 1512), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
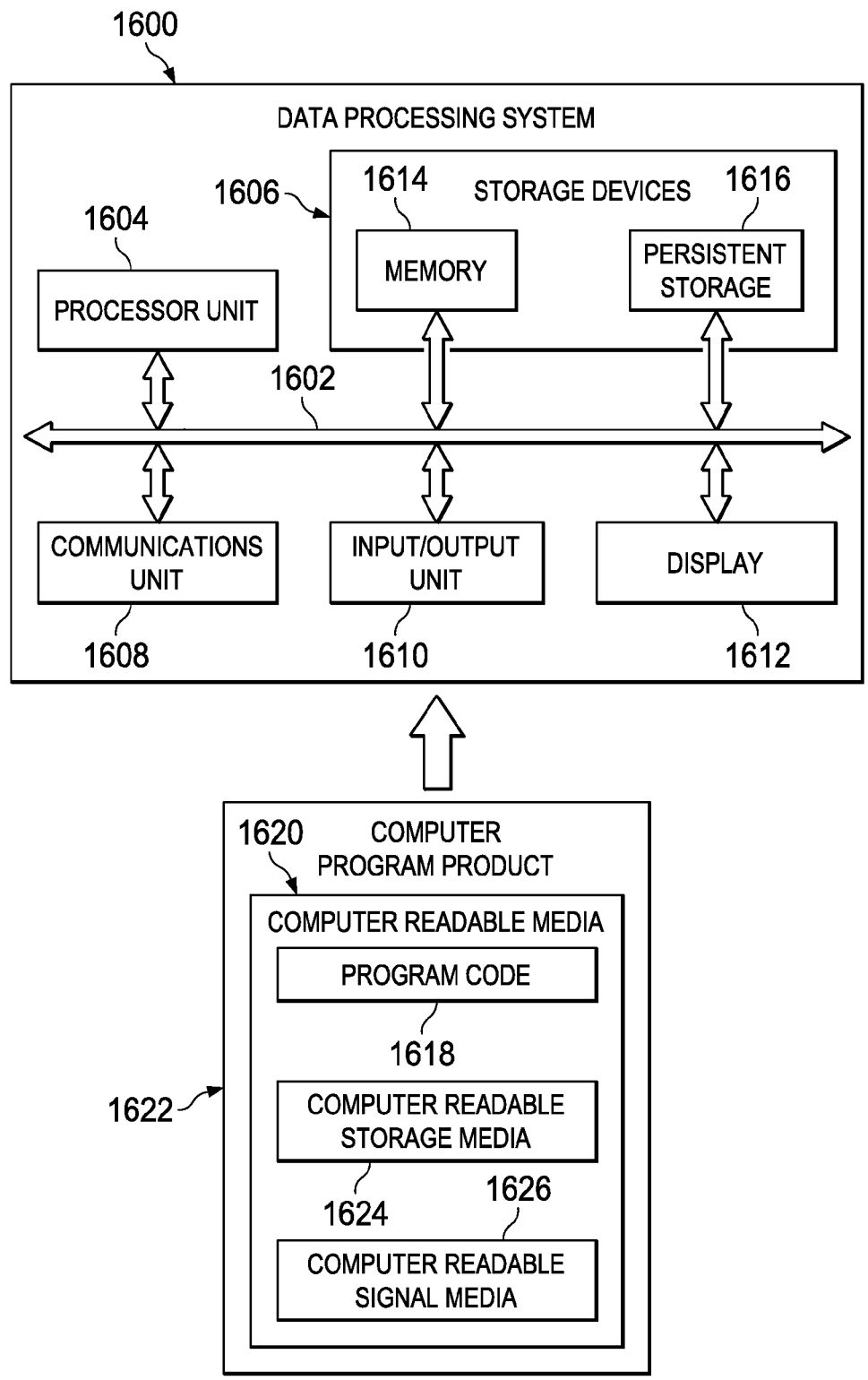
FIG. 16 is an illustration of a data processing system in the form of a block diagram in accordance with an illustrative embodiment.

Turning now to FIG. 16, an illustration of a data processing system is depicted in the form of a block diagram in accordance with an illustrative embodiment. Data processing system 1600 may be used to implement computer system 102 in FIG. 1. As depicted, data processing system 1600 includes communications framework 1602, which provides communications between processor unit 1604, storage devices 1606, communications unit 1608, input/output unit 1610, and display 1612. In some cases, communications framework 1602 may be implemented as a bus system.

Processor unit 1604 is configured to execute instructions for software to perform a number of operations. Processor unit 1604 may comprise a number of processors, a multiprocessor core, and/or some other type of processor, depending on the implementation. In some cases, processor unit 1604 may take the form of a hardware unit, such as a circuit system, an application specific integrated circuit (ASIC), a programmable logic device, or some other suitable type of hardware unit.

Instructions for the operating system, applications, and/or programs run by processor unit 1604 may be located in storage devices 1606. Storage devices 1606 may be in communication with processor unit 1604 through communications framework 1602. As used herein, a storage device, also referred to as a computer readable storage device, is any piece of hardware capable of storing information on a temporary and/or permanent basis. This information may include, but is not limited to, data, program code, and/or other information.

Memory 1614 and persistent storage 1616 are examples of storage devices 1606. Memory 1614 may take the form of, for example, a random access memory or some type of volatile or non-volatile storage device. Persistent storage 1616 may comprise any number of components or devices. For example, persistent storage 1616 may comprise a hard drive, a flash memory, a rewritable optical disk, a rewritable magnetic tape, or some combination of the above. The media used by persistent storage 1616 may or may not be removable.

Communications unit 1608 allows data processing system 1600 to communicate with other data processing systems and/or devices. Communications unit 1608 may provide communications using physical and/or wireless communications links.

Input/output unit 1610 allows input to be received from and output to be sent to other devices connected to data processing system 1600. For example, input/output unit 1610 may allow user input to be received through a keyboard, a mouse, and/or some other type of input device. As another example, input/output unit 1610 may allow output to be sent to a printer connected to data processing system 1600.

Display 1612 is configured to display information to a user. Display 1612 may comprise, for example, without limitation, a monitor, a touch screen, a laser display, a holographic display, a virtual display device, and/or some other type of display device.

In this illustrative example, the processes of the different illustrative embodiments may be performed by processor unit 1604 using computer-implemented instructions. These instructions may be referred to as program code, computer usable program code, or computer readable program code and may be read and executed by one or more processors in processor unit 1604.

In these examples, program code 1618 is located in a functional form on computer readable media 1620, which is selectively removable, and may be loaded onto or transferred to data processing system 1600 for execution by processor unit 1604. Program code 1618 and computer readable media 1620 together form computer program product 1622. In this illustrative example, computer readable media 1620 may be computer readable storage media 1624 or computer readable signal media 1626.

Computer readable storage media 1624 is a physical or tangible storage device used to store program code 1618 rather than a medium that propagates or transmits program code 1618. Computer readable storage media 1624 may be, for example, without limitation, an optical or magnetic disk or a persistent storage device that is connected to data processing system 1600.

Alternatively, program code 1618 may be transferred to data processing system 1600 using computer readable signal media 1626. Computer readable signal media 1626 may be, for example, a propagated data signal containing program code 1618. This data signal may be an electromagnetic signal, an optical signal, and/or some other type of signal that can be transmitted over physical and/or wireless communications links.

The illustration of data processing system 1600 in FIG. 16 is not meant to provide architectural limitations to the manner in which the illustrative embodiments may be implemented. The different illustrative embodiments may be implemented in a data processing system that includes components in addition to or in place of those illustrated for data processing system 1600. Further, components shown in FIG. 16 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing images, the method comprising:
identifying a set of first candidate chips in an electro-optical image, wherein each of the set of first candidate chips captures a corresponding candidate target of a set of candidate targets;
identifying a plurality of sub-regions within a first candidate chip of the set of first candidate chips, wherein the first candidate chip captures a candidate target of the set of candidate targets;
computing a signature for each of the plurality of sub-regions to form a plurality of signatures;
pairing each sub-region of the plurality of subregions with each reference sub-region of a plurality of reference sub-regions in a first reference chip to form a plurality of pairs;
scoring each of the plurality of pairs to form a plurality of initial scores;
generating a set of second scores for the set of candidate targets using a second image;
computing a set of final scores for the set of candidate targets using a set of first scores and the set of second scores; and
determining which of the set of candidate targets is a target of interest based on the set of final scores.

2. The method of claim 1, wherein identifying the set of candidate targets further comprises:
identifying a set of second candidate chips in an infrared image, wherein each of the set of second candidate chips corresponds to one of the set of first candidate chips.

3. The method of claim 1, wherein generating the set of first scores further comprises:
selecting a pair from the plurality of pairs having a best initial score of the plurality of initial scores as a best matched pair, wherein the best matched pair includes a best matched sub-region and a best matched reference sub-region and wherein the best initial score becomes a first score for the candidate target captured in the first candidate chip.

4. The method of claim 3, wherein generating the set of second scores comprises:
identifying a second candidate chip in the second image that corresponds to the first candidate chip; and
identifying a sub-region within the second candidate chip that corresponds to the best matched sub-region within the first candidate chip.

5. The method of claim 4, wherein generating the set of second scores further comprises:
scoring the sub-region within the second candidate chip to generate a second score for the candidate target.

6. The method of claim 5, wherein scoring the subregion comprises:
creating a base histogram vector for the sub-region; and
performing a number of rotational shifts using the base histogram vector to form a plurality of histogram vectors that includes the base histogram vector.

7. The method of claim 6, wherein scoring the subregion further comprises:
identifying a reference histogram vector for the best matched reference sub-region; and
computing a matching score for each pairing of the reference histogram vector with one of the plurality of histogram vectors to form a plurality of matching scores for the sub-region.

8. The method of claim 7, wherein scoring the subregion further comprises:
selecting a best matching score from the plurality of matching scores for the sub-region as the second score for the candidate target.

9. The method of claim 1, wherein computing the set of final scores comprises:
multiplying a first score of the set of first scores for a candidate target of the set of candidate targets by a second score of the set of second scores for the candidate target to form a final score for the candidate target.

10. The method of claim 1 further comprising:
synchronizing a sequence of first images that includes a first image with a sequence of second images that includes the second image.

11. The method of claim 1 further comprising:
identifying a reference coordinate system for both a first image and the second image.

12. A method for processing images, the method comprising:
identifying a set of first candidate chips in an electro-optical image, wherein each of the set of first candidate chips captures a corresponding candidate target of a set of candidate targets;
identifying a plurality of sub-regions within a first candidate chip of the set of first candidate chips, wherein the first candidate chip captures a candidate target of the set of candidate targets;
computing a signature for each of the plurality of sub-regions to form a plurality of signatures;
pairing each sub-region of the plurality of subregions with each reference sub-region of a plurality of reference sub-regions in a first reference chip to form a plurality of pairs;
scoring each of the plurality of pairs to form a plurality of initial scores;
identifying a set of second candidate chips in a second image that corresponds with the set of first candidate chips;
generating a set of second scores for the set of second candidate chips using the second image;
computing a set of final scores for the set of candidate targets using a set of first scores and the set of second scores; and
determining which of the set of candidate targets is a target of interest based on the set of final scores.

13. The method of claim 12, wherein scoring each of the plurality of pairs to form a plurality of initial scores comprises:
basing the scoring on Kullback-Leibler divergence.

14. The method of claim 13, wherein generating the set of second scores comprises:
generating a second score for each second candidate chip in the set of second candidate chips using a second reference chip based on rotationally shifted histograms of oriented gradients.

15. An apparatus comprising:
- an image processor that identifies a set of first candidate chips in an electro-optical image, wherein each of the set of first candidate chips captures a corresponding candidate target of a set of candidate targets and that identifies a plurality of sub-regions within a first candidate chip of the set of first candidate chips, wherein the first candidate chip captures a candidate target of the set of candidate targets;
- a scorer that computes a signature for each of the plurality of sub-regions to form a plurality of signatures, pairs each sub-region of the plurality of subregions with each reference sub-region of a plurality of reference sub-regions in a first reference chip to form a plurality of pairs, and scores each of the plurality of pairs to form a plurality of initial scores; and
- a target manager that determines which of the set of candidate targets is a target of interest based on a set of final scores.

16. The apparatus of claim 15, wherein a second image is an infrared image.

17. The apparatus of claim 16, wherein the electro-optical image is one of a sequence of electro-optical images that is synchronized with a sequence of infrared images that includes the infrared image.

* * * * *

UNITED STATES PATENT AND TRADEMARK OFFICE
CERTIFICATE OF CORRECTION

PATENT NO.      : 9,727,785 B2
APPLICATION NO. : 14/743349
DATED           : August 8, 2017
INVENTOR(S)     : Hyukseong Kwon, Kyungnam Kim and Yuri Owechko It is certified that error appears in the above-identified patent and that said Letters Patent is hereby corrected as shown below:

In the Claims

Column 17, Line 26, replace "subregions" with --sub-regions--.
Column 19, Line 12, replace "subregions" with --sub-regions--.

Signed and Sealed this
Seventeenth Day of October, 2017

Joseph Matal
*Performing the Functions and Duties of the
Under Secretary of Commerce for Intellectual Property and
Director of the United States Patent and Trademark Office*